US012654344B2

(12) United States Patent
Masakawa et al.

(10) Patent No.: US 12,654,344 B2
(45) Date of Patent: Jun. 16, 2026

(54) CUTTING DEVICE

(71) Applicant: Panasonic Intellectual Property Management Co., Ltd., Osaka (JP)

(72) Inventors: Yuuta Masakawa, Shiga (JP); Satoshi Sobagaki, Kyoto (JP); Hitoshi Ogawa, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 108 days.

(21) Appl. No.: 18/733,014

(22) Filed: Jun. 4, 2024

(65) Prior Publication Data

US 2025/0001629 A1 Jan. 2, 2025

(30) Foreign Application Priority Data

Jun. 28, 2023 (JP) ................................ 2023-106315

(51) Int. Cl.
*B26B 19/20* (2006.01)
*B26B 19/06* (2006.01)

(52) U.S. Cl.
CPC ............ *B26B 19/205* (2013.01); *B26B 19/06* (2013.01)

(58) Field of Classification Search
CPC .................................................... B26B 19/205
See application file for complete search history.

(56) References Cited

U.S. PATENT DOCUMENTS 2,551,759 A * 5/1951 Pence ................... F24C 15/102
219/457.1
3,596,479 A * 8/1971 Remlinger ............... D04B 9/54
66/140 R
3,693,758 A * 9/1972 Tierney ................... B26B 19/40
184/102
3,797,111 A * 3/1974 Keane ..................... B26B 19/44
15/314
4,347,758 A * 9/1982 Geil ......................... G05G 5/06
D8/312
4,373,405 A * 2/1983 Geil ....................... H01C 10/14
74/553
4,776,095 A * 10/1988 Tsujimoto ............... B26B 19/20
30/233

(Continued)

FOREIGN PATENT DOCUMENTS

EP 2926958 10/2015
JP 2005-304627 11/2005
JP 2015-195869 11/2015

OTHER PUBLICATIONS

The EPC Office Action dated Nov. 11, 2024 for the related European Patent Application No. 24181663.6.

*Primary Examiner* — Sean M Michalski
(74) *Attorney, Agent, or Firm* — Rimon P.C.

(57) ABSTRACT

The present disclosure provides a cutting device capable of more reliably preventing shavings from entering a gap formed between a dial and a main body. A cutting device according to the present disclosure includes a main body, a fixed blade fixed to the main body, a movable blade capable of reciprocating in a slidable way with respect to the fixed blade, and a dial that is rotatably attached to the main body and is operated when a cutting height is adjusted. A rib which faces a clearance formed between the dial and the main body in a radial direction of the dial is formed in the main body.

5 Claims, 23 Drawing Sheets

(56) References Cited

U.S. PATENT DOCUMENTS

| | | | | | |
|---|---|---|---|---|---|
| 4,991,461 | A * | 2/1991 | Sennett | G05G 1/06 | 74/551.9 |
| 5,054,199 | A * | 10/1991 | Ogawa | B26B 19/06 | 30/200 |
| 5,185,931 | A * | 2/1993 | Fujikawa | B26B 19/20 | 30/201 |
| D500,890 | S * | 1/2005 | Muramatsu | D28/53 | |
| 7,100,286 | B2 * | 9/2006 | Nakakura | B26B 19/20 | 30/201 |
| 7,234,242 | B2 * | 6/2007 | Yao | B26B 19/3846 | 30/233 |
| 7,921,566 | B2 * | 4/2011 | Yamaguchi | B26B 19/06 | 30/200 |
| 9,833,914 | B2 * | 12/2017 | Sobagaki | B26B 19/20 | |
| D981,043 | S * | 3/2023 | Rajasekaran | D28/53 | |
| 11,819,058 | B2 * | 11/2023 | Wang | A24F 40/485 | |
| 2008/0052915 | A1 * | 3/2008 | Fukutani | B26B 19/3846 | 30/241 |
| 2008/0178468 | A1 * | 7/2008 | Liao | B26B 19/3886 | 30/34.05 |
| 2009/0056143 | A1 * | 3/2009 | Fukutani | B26B 19/06 | 30/42 |
| 2009/0320296 | A1 * | 12/2009 | Morisugi | B26B 19/3846 | 30/45 |
| 2012/0233865 | A1 * | 9/2012 | Kammer | B26B 19/3846 | 30/201 |
| 2021/0112861 | A1 * | 4/2021 | Wang | A24F 40/10 | |
| 2022/0231468 | A1 * | 7/2022 | Zhang | H01R 13/70 | |
| 2023/0173698 | A1 * | 6/2023 | Tanabe | B26B 19/063 | 30/201 |
| 2023/0226706 | A1 * | 7/2023 | Haagsma | B26B 19/3886 | 30/201 |

* cited by examiner

CUTTING DEVICE

BACKGROUND

1. Technical Field

The present disclosure relates to a cutting device.

2. Description of the Related Art

Conventionally, as a cutting device disclosed in PTL 1, there has been proposed a hair clipper including a blade part including a fixed blade and a movable blade, and a main body to which the blade part is attached, in which hair is cut by reciprocating sliding of the movable blade with respect to the fixed blade.

In PTL 1, a hair clipper as a cutting device includes a cutting height adjustment mechanism capable of changing a cutting height of hair (that is, a length of the hair remaining after being cut by the blade part), and the cutting height adjustment mechanism includes a dial rotatably attached to main body 11. By operating the dial (more specifically, by rotating the dial relatively with respect to the main body), the movable blade slides with respect to the fixed blade in a direction intersecting the reciprocating sliding, and the cutting height of the hair is adjusted by sliding the movable blade with respect to the fixed blade in the direction intersecting the reciprocating sliding.

CITATION LIST

Patent Literature

PTL 1: Unexamined Japanese Patent Publication No. 2015-195869

SUMMARY

As described above, in the cutting device of the type in which the cutting height is adjusted by operating the dial, it is preferable to more reliably prevent intrusion of shavings into a gap formed between the dial and the main body.

Therefore, an object of the present disclosure is to provide a cutting device in which shavings are prevented more reliably from entering the gap formed between the dial and the main body.

A cutting device according to one aspect of the present disclosure includes: a main body; a fixed blade fixed to the main body; a movable blade capable of reciprocating in a slidable way with respect to the fixed blade; and a dial that is rotatably attached to the main body and is operated when a cutting height is adjusted, in which a rib which faces a clearance formed between the dial and the main body in a radial direction of the dial is formed in the main body.

According to the present disclosure, it is possible to obtain a cutting device in which shavings are prevented more reliably from entering a gap formed between the dial and the main body.

DETAILED DESCRIPTIONS

Hereinafter, an exemplary embodiment will be described in detail with reference to the drawings. However, detailed description more than necessary may not be described. For example, detailed description of already well-known matters and duplicated description of substantially identical elements may not be described.

Note that the attached drawings and the following description are provided for those skilled in the art to fully understand the present disclosure, and are not intended to limit the subject matter as described in the appended claims.

Furthermore, in the following exemplary embodiment and its modifications, a hair clipper for cutting hair (e.g., head hair) of a user is exemplified as a cutting device.

Exemplary Embodiment

Figure 1:
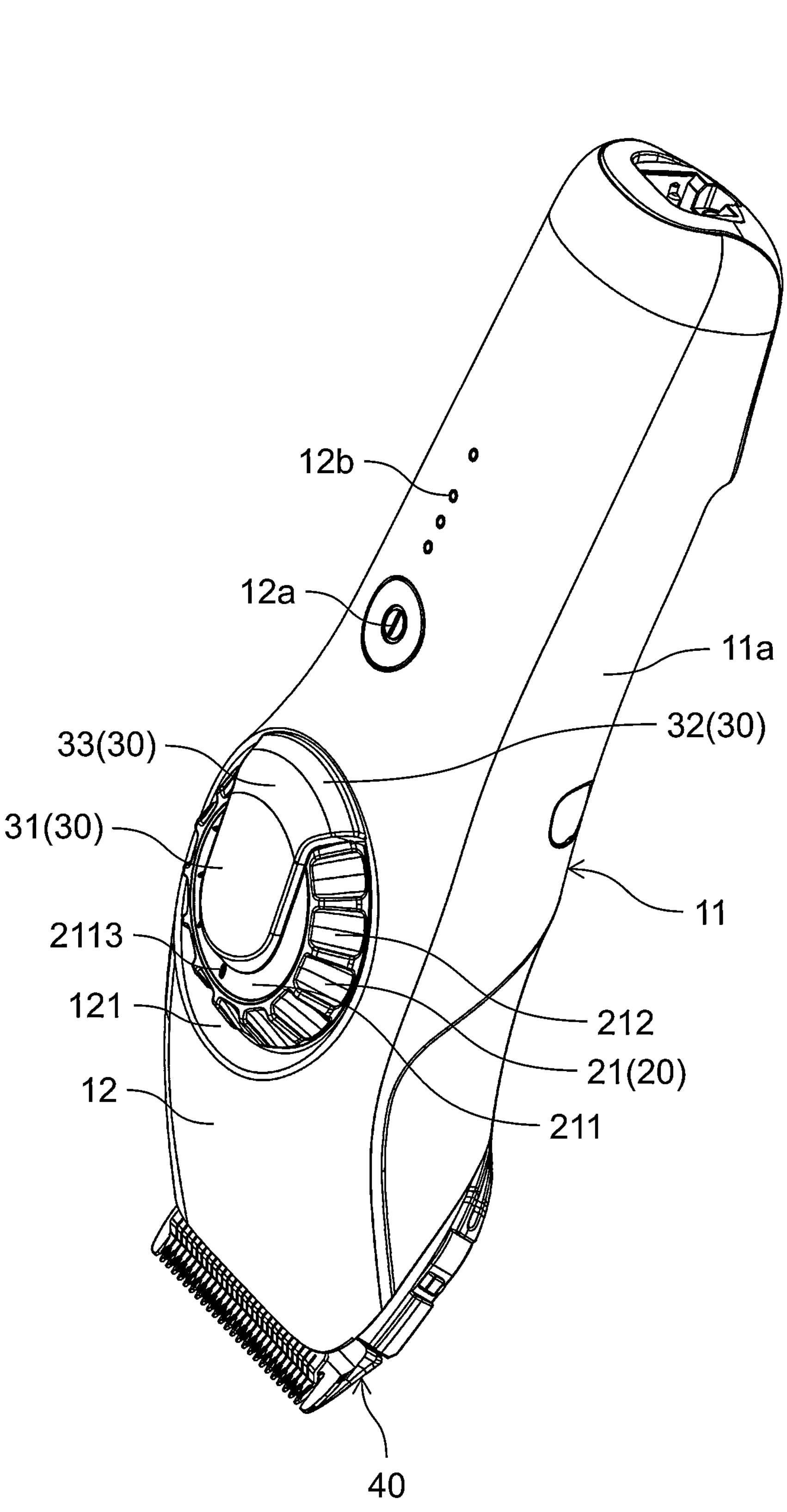
FIG. 1 is a perspective view illustrating an example of a hair clipper according to an exemplary embodiment.
Figure 2:
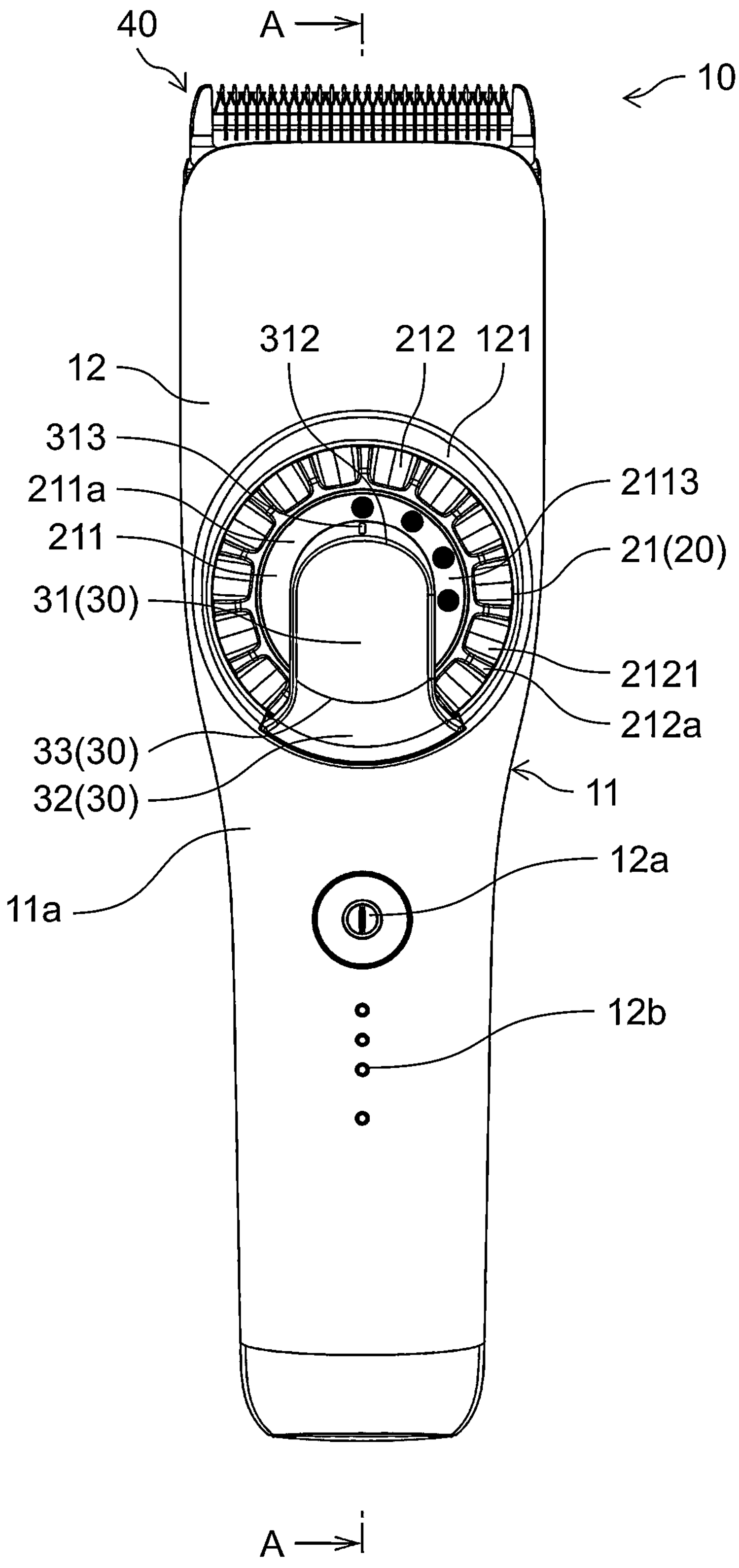
FIG. 2 is a front view illustrating an example of the hair clipper according to the exemplary embodiment.
Figure 3:
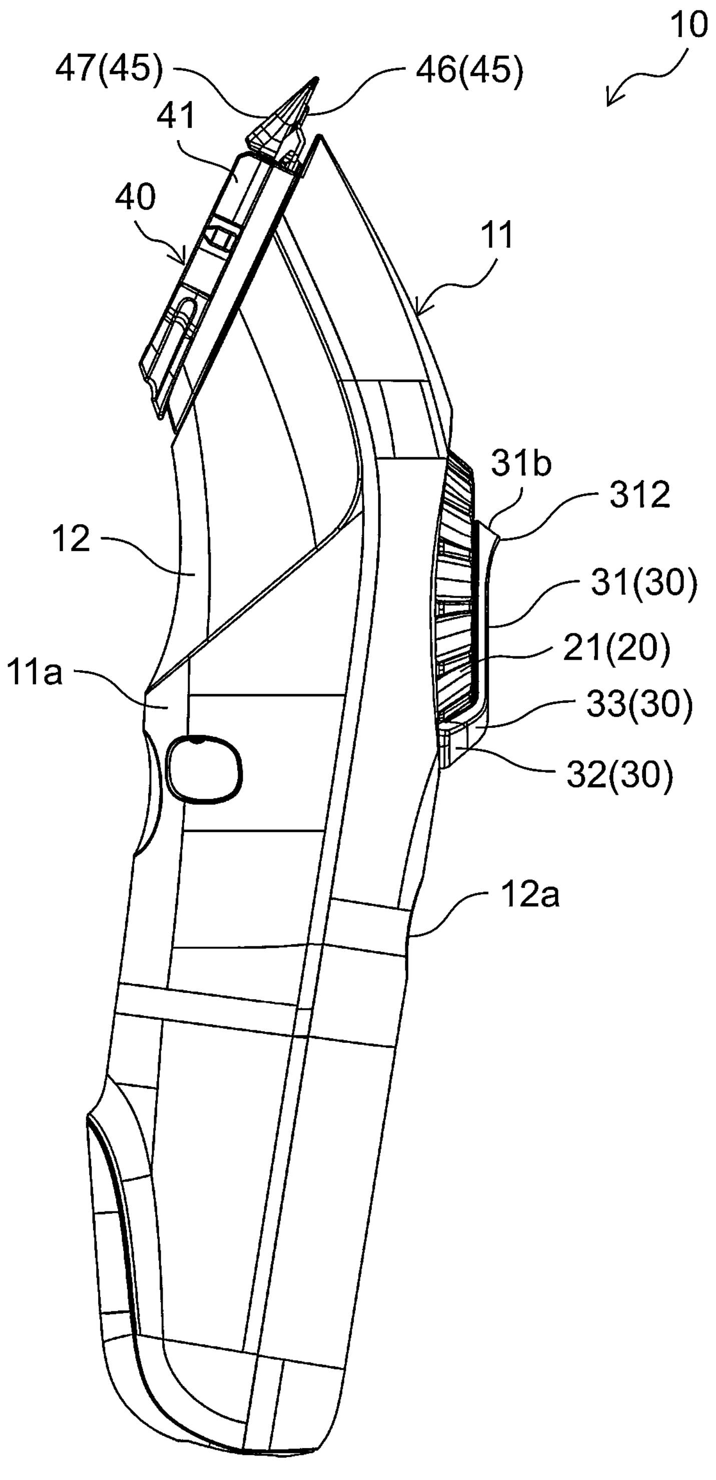
FIG. 3 is a side view illustrating an example of the hair clipper according to the exemplary embodiment.
Figure 4:
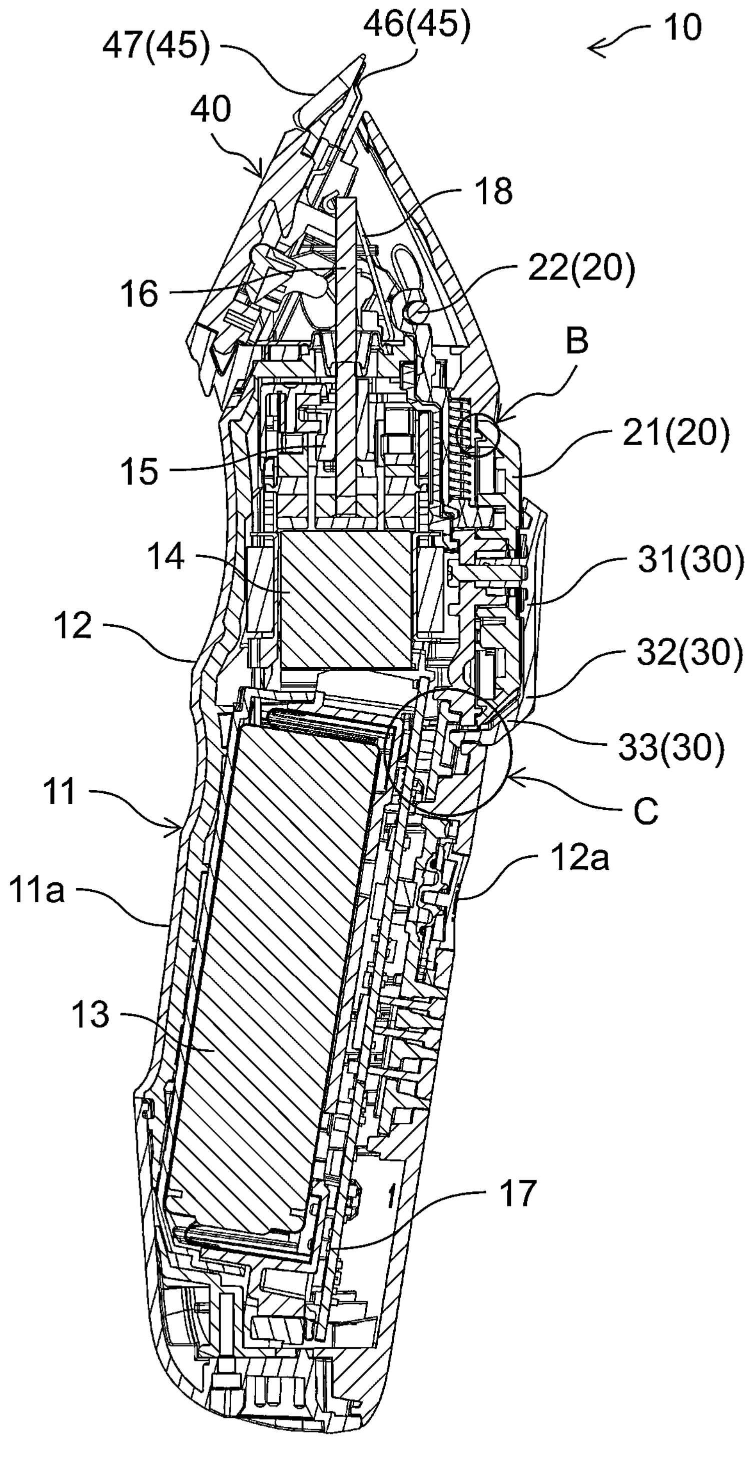
FIG. 4 is a cross-sectional view taken along line A-A of FIG. 2.

FIG. 1 is a perspective view illustrating an example of hair clipper 10 according to an exemplary embodiment. FIG. 2 is a front view illustrating an example of hair clipper 10 according to the exemplary embodiment. FIG. 3 is a side view illustrating an example of hair clipper 10 according to the exemplary embodiment. FIG. 4 is a cross-sectional view taken along line A-A of FIG. 2. As illustrated in FIGS. 1 to 4, hair clipper 10 according to the present exemplary embodiment includes main body 11 and blade block 40 detachably attached to main body 11. In the present exemplary embodiment, main body 11 has an elongated shape, and grip 11*a* that can be gripped by hand is formed on main body 11.

This hair clipper 10 is, for example, a device for treating or arranging hair of a user by cutting the hair of the user to a desired length. Specifically, blade block 40 includes fixed blade 47 made of metal, and movable blade 46 made of metal that reciprocates and slides in a width direction (that is, one direction) with respect to fixed blade 47. Blade block 40 is attached to main body 11, and movable blade 46 is reciprocally slid in the width direction with respect to fixed blade 47 by using electric motor 14 accommodated in main body 11 as a drive source, whereby fixed blade 47 and movable blade 46 sandwich and cut hair.

Furthermore, in the present exemplary embodiment, main body 11 includes housing 12 forming a substantially S-shaped outer shell in a side view. Housing 12 can be formed using, for example, a material such as a synthetic resin, and operation switch 12*a* is attached to a front face of housing 12 such that operation switch 12*a* can be pushed inward in a state of being exposed to the outside. Moreover, on the front surface of housing 12, display 12*b* for checking an on/off state of a power supply and a charging state of rechargeable battery 13 is formed.

Furthermore, in the present exemplary embodiment, housing 12 is formed by joining a plurality of divided bodies, and a cavity is formed inside housing 12 formed by joining the divided bodies. Various electric components are accommodated in the cavity. The plurality of split bodies may be joined together by using a screw or fitting the split bodies to each other, for example.

In the present exemplary embodiment, rechargeable battery 13 and electric motor 14 driven by rechargeable battery 13 are accommodated in a cavity formed inside housing 12. Furthermore, power transmission mechanism 15 that transmits a rotational driving force of electric motor 14 to blade block 40, and shaft 16 reciprocally driven by power transmission mechanism 15 are accommodated in the cavity formed inside housing 12. In the present exemplary embodiment, as illustrated in FIG. 4, shaft 16 is accommodated in the cavity inside housing 12 in a state where a distal end thereof protrudes toward blade block 40 (that is, toward the upper side of FIG. 4), and is coupled to guide plate 42, which will be described later, of blade block 40. Note that power may be also supplied from the outside using a power supply cord. Furthermore, a method of driving blade block 40 is not limited to the above-described method, and various methods can be used. For example, it is possible to drive blade block 40 using an eccentric shaft that is eccentrically rotationally driven.

Moreover, controller 17 that controls power supply to electric motor 14 according to a pressing operation of operation switch 12*a* exposed to the outside are accommodated in the cavity formed inside housing 12.

Figure 5:
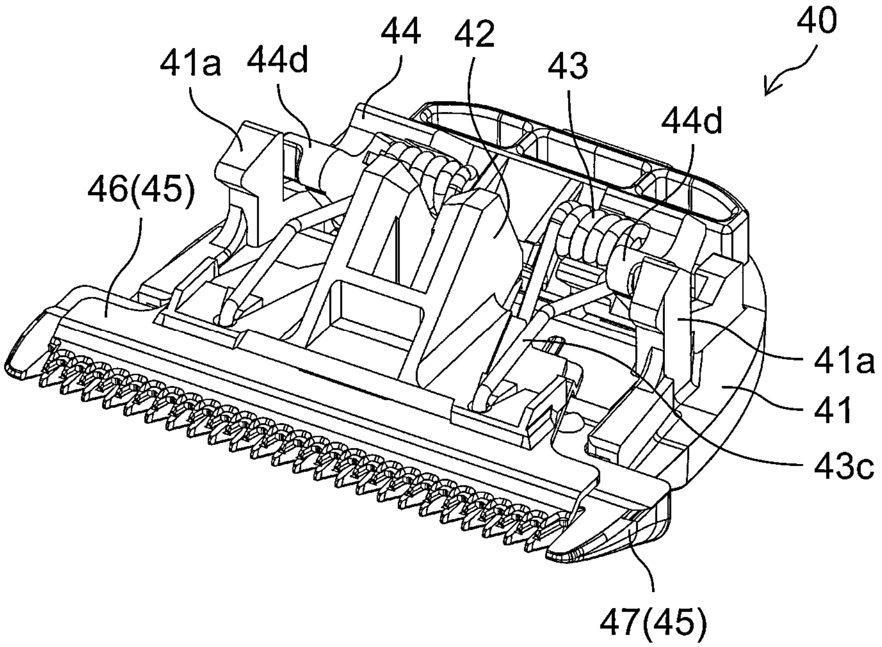
FIG. 5 is a perspective view illustrating an example of a blade block included in the hair clipper according to the exemplary embodiment.
Figure 6:
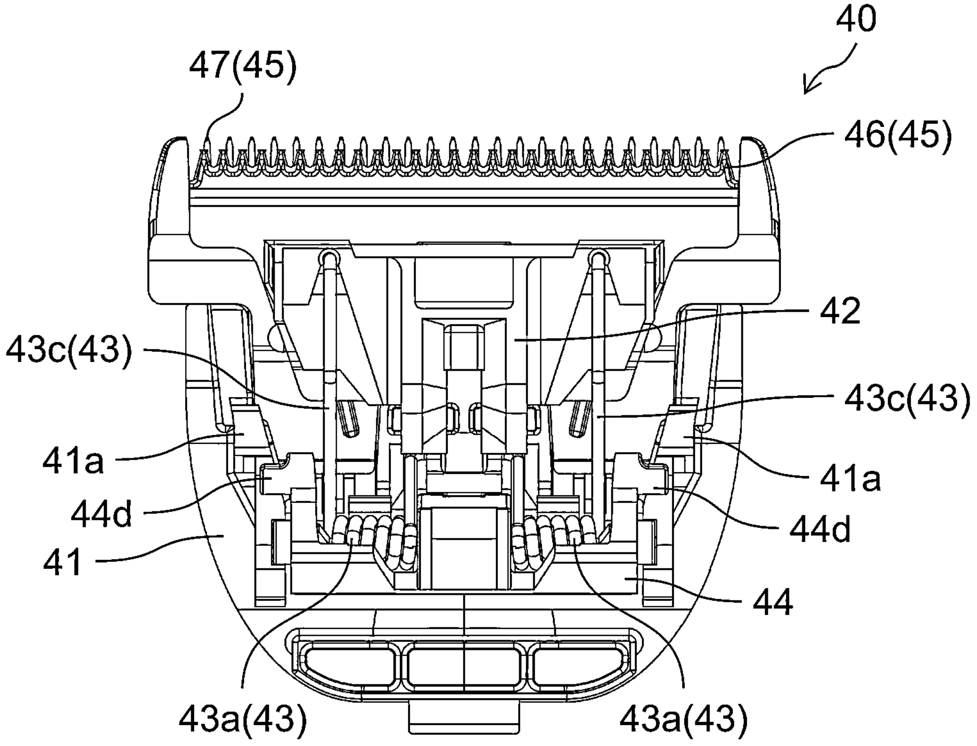
FIG. 6 is a plan view illustrating an example of the blade block included in the hair clipper according to the exemplary embodiment.
Figure 7:
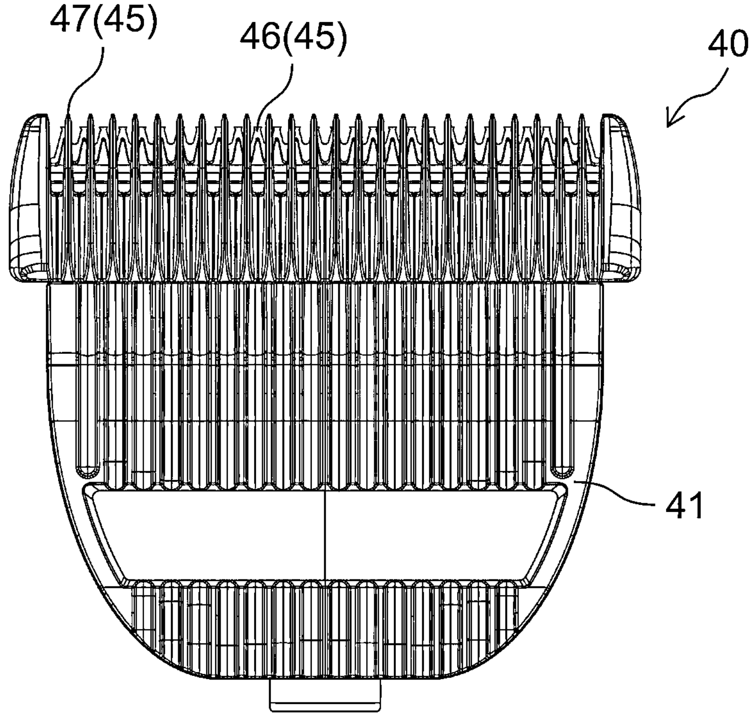
FIG. 7 is a rear view illustrating an example of the blade block included in the hair clipper according to the exemplary embodiment.
Figure 8:
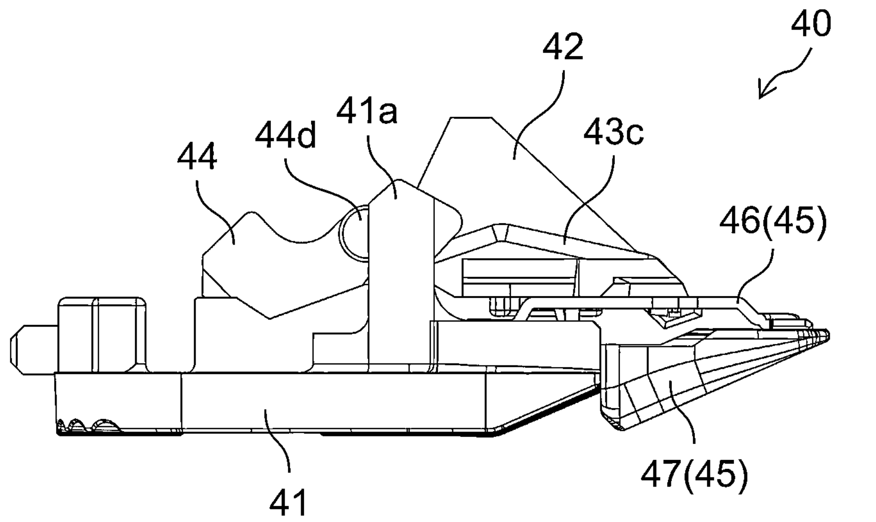
FIG. 8 is a side view illustrating an example of the blade block included in the hair clipper according to the exemplary embodiment.
Figure 9:
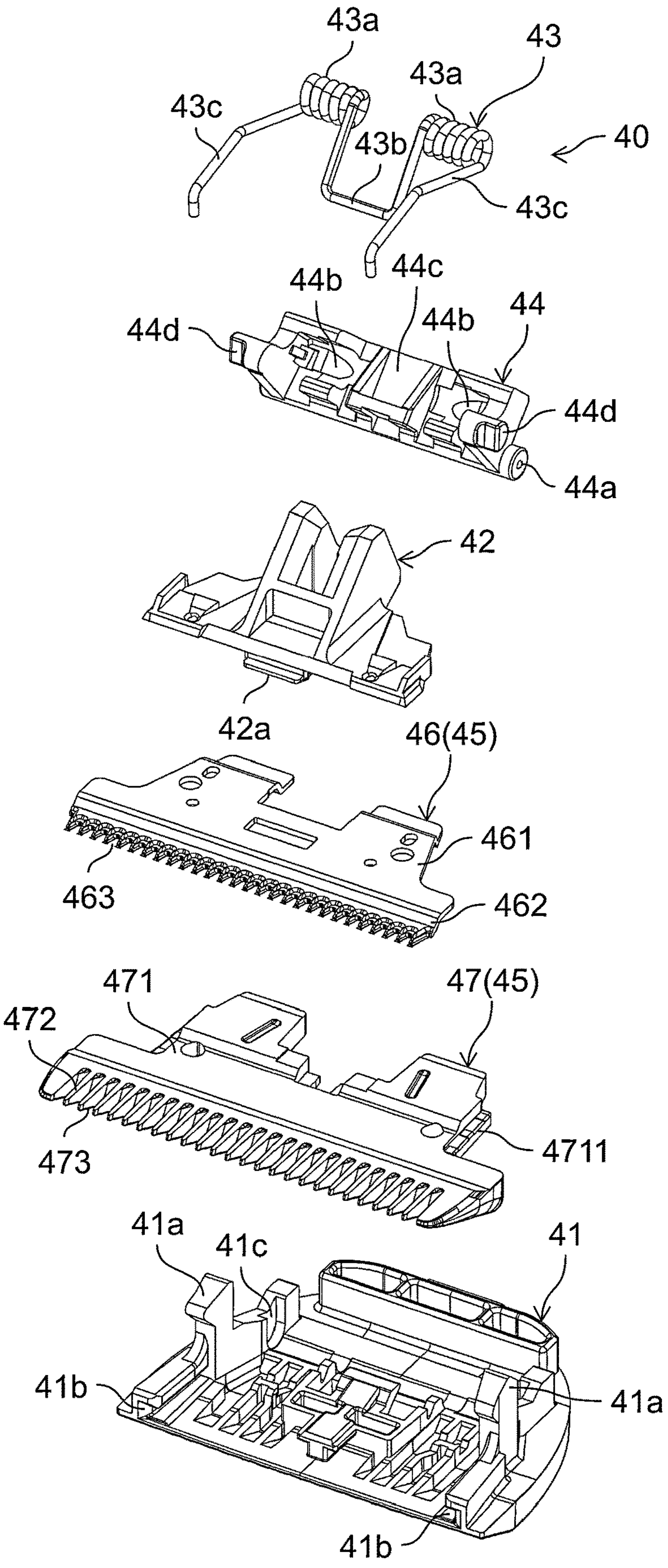
FIG. 9 is an exploded perspective view illustrating an example of the blade block included in the hair clipper according to the exemplary embodiment.

FIG. 5 is a perspective view illustrating an example of blade block 40 included in hair clipper 10 according to the exemplary embodiment. FIG. 6 is a plan view illustrating an example of blade block 40 included in hair clipper 10 according to the exemplary embodiment. FIG. 7 is a rear view illustrating an example of blade block 40 included in hair clipper 10 according to the exemplary embodiment. FIG. 8 is a side view illustrating an example of blade block 40 included in hair clipper 10 according to the exemplary embodiment. FIG. 9 is an exploded perspective view illustrating an example of blade block 40 included in hair clipper 10 according to the exemplary embodiment. Blade block 40 has a function of cutting hair, and as illustrated in FIGS. 5 to 8, includes blade part 45 (more specifically, the blade of a hair clipper) formed by disposing movable blade 46 and fixed blade 47 so as to face each other. Blade part 45 is configured such that movable blade bar 462, which will be described later, of movable blade 46 reciprocally slides in the width direction with respect to fixed blade bar 472, which will be described later, of fixed blade 47.

Figure 10:
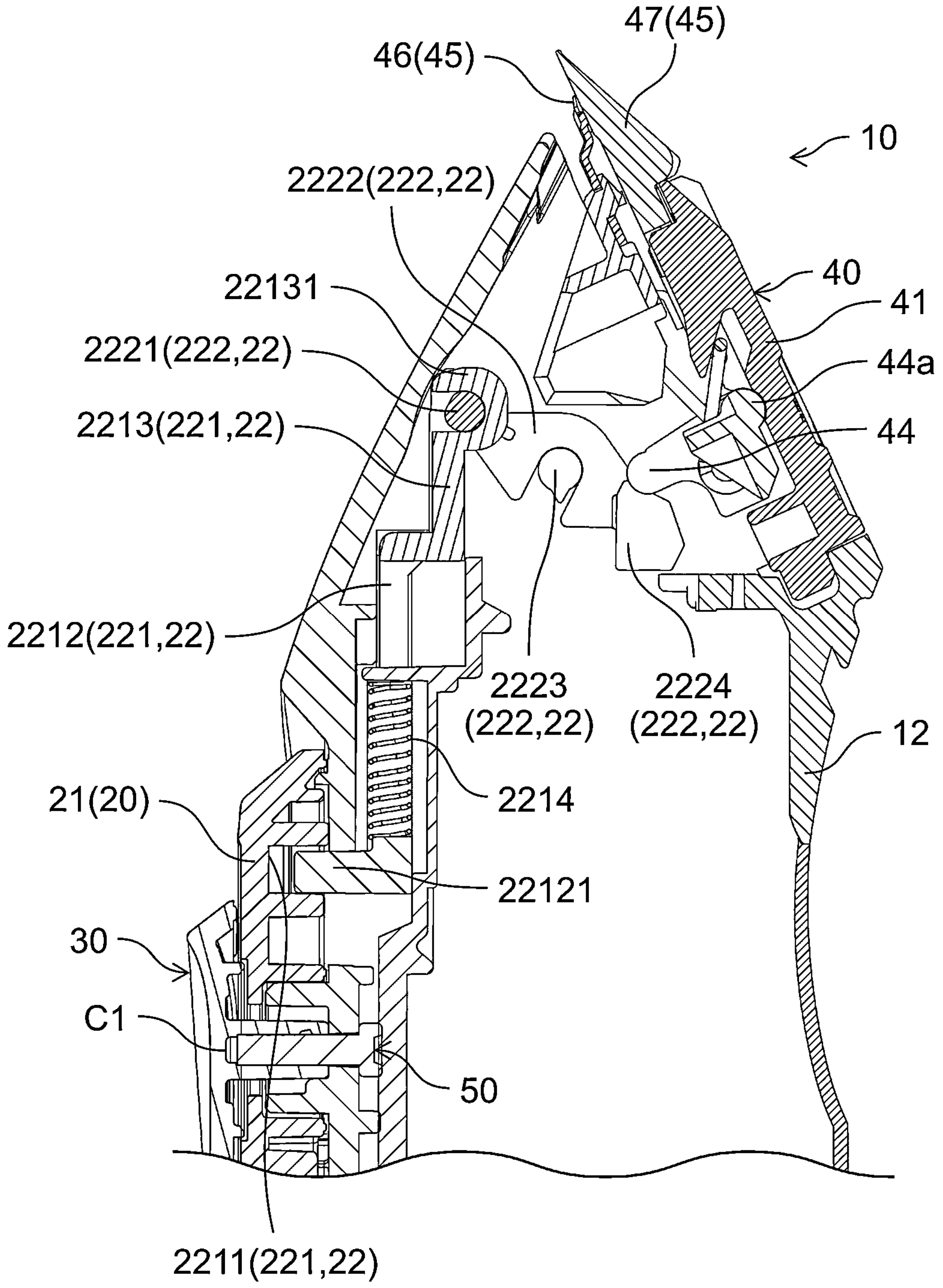
FIG. 10 is a diagram illustrating an example of a cutting height adjustment mechanism included in the hair clipper according to the exemplary embodiment, and is a cross-sectional view illustrating a state where the cutting height is maximized.
Figure 11:
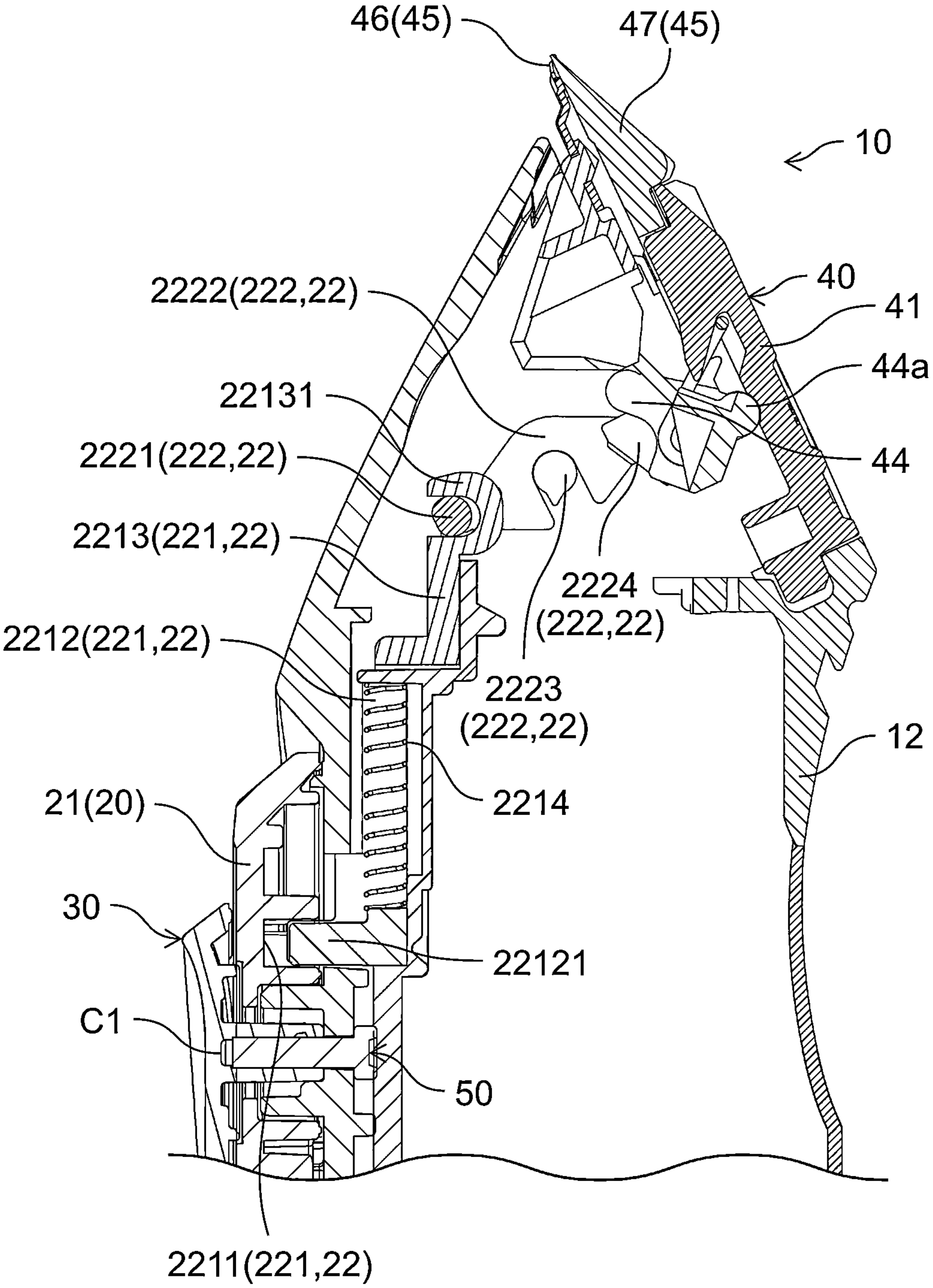
FIG. 11 is a diagram illustrating an example of the cutting height adjustment mechanism included in the hair clipper according to the exemplary embodiment, and is a cross-sectional view illustrating a state where the cutting height is minimized.

Moreover, as illustrated in FIG. 9, blade block 40 further includes fixing plate 41 made of resin on which blade part 45 is disposed, and guide plate 42 made of resin and fixed to movable blade 46. Furthermore, blade block 40 includes metallic push-up spring 43 that presses movable blade 46 toward fixed blade 47, and resinous switching lever 44 that holds push-up spring 43. FIG. 10 is a diagram illustrating an example of cutting height adjustment mechanism 20 included in hair clipper 10 according to the exemplary embodiment, and is a cross-sectional view illustrating a state where the cutting height is maximized. FIG. 11 is a diagram illustrating an example of cutting height adjustment mechanism 20 included in hair clipper 10 according to the exemplary embodiment, and is a cross-sectional view illustrating a state where the cutting height is minimized. In the present exemplary embodiment, switching lever 44 is held by fixing plate 41 in a state of being relatively rotatable with respect to fixing plate 41, and can swing between a falling attitude illustrated in FIG. 10 and a standing attitude illustrated in FIG. 11.

Fixing plate 41 is a member fixed to main body 11 in a state where fixed blade 47 are fixed, and includes hook part 41*a* for engaging with main body 11, insertion groove 41*b* for inserting and holding insertion protrusion 4711 of fixed blade 47, and holding groove 41*c* that opens upward. Columnar part 44*a* of switching lever 44, which will be described later, is inserted and held in holding groove 41*c* in a state of being relatively rotatable with respect to fixing plate 41.

Guide plate 42 is a member that is coupled to shaft 16 and reciprocates in the width direction in a state where blade block 40 is attached to main body 11, and movable blade 46 is fixed to guide plate 42. In the present exemplary embodiment, guide plate 42 includes hook part 42*a* with which movable blade 46 is engaged, and hook part 42*a* and a heat seal fix movable blade 46 to guide plate 42. Movable blade 46 reciprocally slide in the width direction with respect to fixed blade 47 in conjunction with reciprocation of guide plate 42 in the width direction.

Push-up spring 43 is a member that presses movable blade 46 toward fixed blade 47 to more reliably bring movable blade bar 462 and fixed blade bar 472, which will be described later, into sliding contact with each other, and can be formed by, for example, a torsion spring. In the present exemplary embodiment, push-up spring 43 includes a pair of coil parts 43*a* held by switching lever 44 and connection part 43*b* held by switching lever 44 and connecting the pair of coil parts 43*a*. Furthermore, push-up spring 43 includes arm part 43*c* that is connected to a side opposite to a side of connection part 43*b* of each of coil parts 43*a*, is fixed to movable blade 46, and presses movable blade 46 toward fixed blade 47.

Moreover, in the present exemplary embodiment, as illustrated in FIG. 4, blade stop spring 18 is fixed to housing 12 with a screw, and blade stop spring 18 holds blade block 40, so that blade block 40 is prevented from coming off from housing 12.

Note that the attachment can be attached to blade block 40, and a cutting height of hair clipper 10 can be changed by attaching the attachment.

Moreover, hair clipper 10 according to the present exemplary embodiment is configured to change a cutting height of hair without using an attachment, and main body 11 includes cutting height adjustment mechanism 20. By operating cutting height adjustment mechanism 20, a standing and falling operation of switching lever 44 is performed, and the cutting height of the hair is changed by the standing and falling operation of switching lever 44.

In the present exemplary embodiment, switching lever 44 includes columnar part 44*a* that is inserted and held in holding groove 41*c* of fixing plate 41 in a state of being relatively rotatable with respect to fixing plate 41. Furthermore, switching lever 44 includes accommodation recess 44*b* in which coil part 43*a* of push-up spring 43 is accommodated in a fitted state, and accommodation recess 44*c* in which the connection part of push-up spring 43 is accommodated. Moreover, switching lever 44 includes protrusion 44*d* operated by transmission mechanism 22. Switching lever 44 is held by fixing plate 41 in a state of being biased toward the falling attitude by push-up spring 43.

Figure 12:
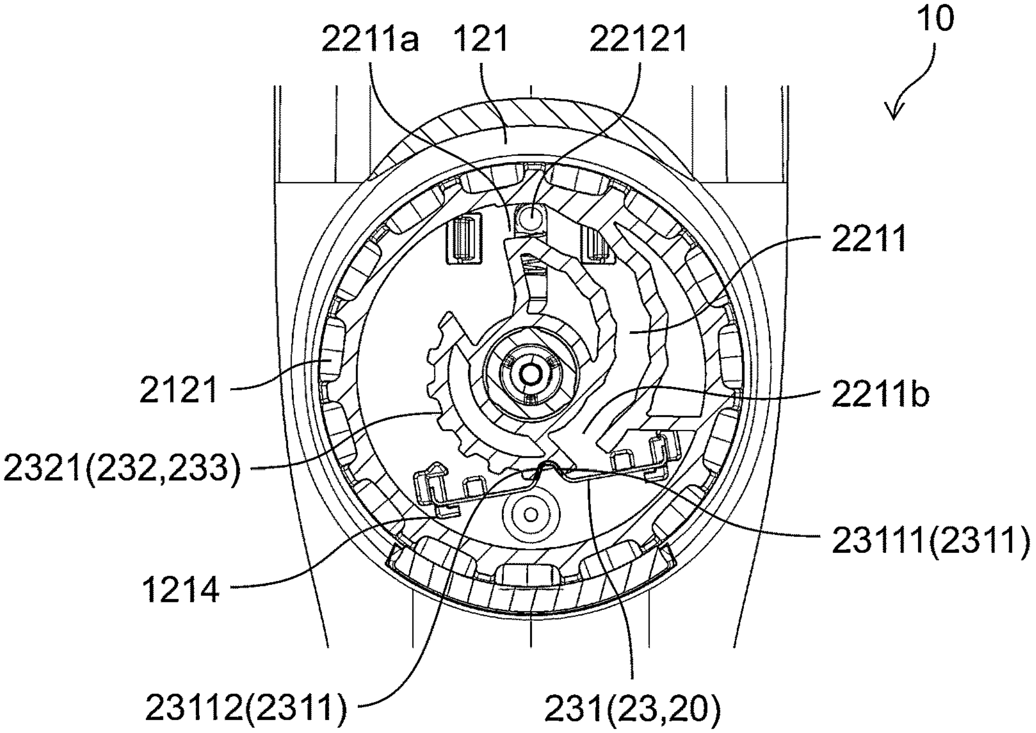
FIG. 12 is a diagram illustrating an example of the cutting height adjustment mechanism included in the hair clipper according to the exemplary embodiment, and is an enlarged plan view illustrating an inside of a dial in a state where the cutting height is maximized.
Figure 13:
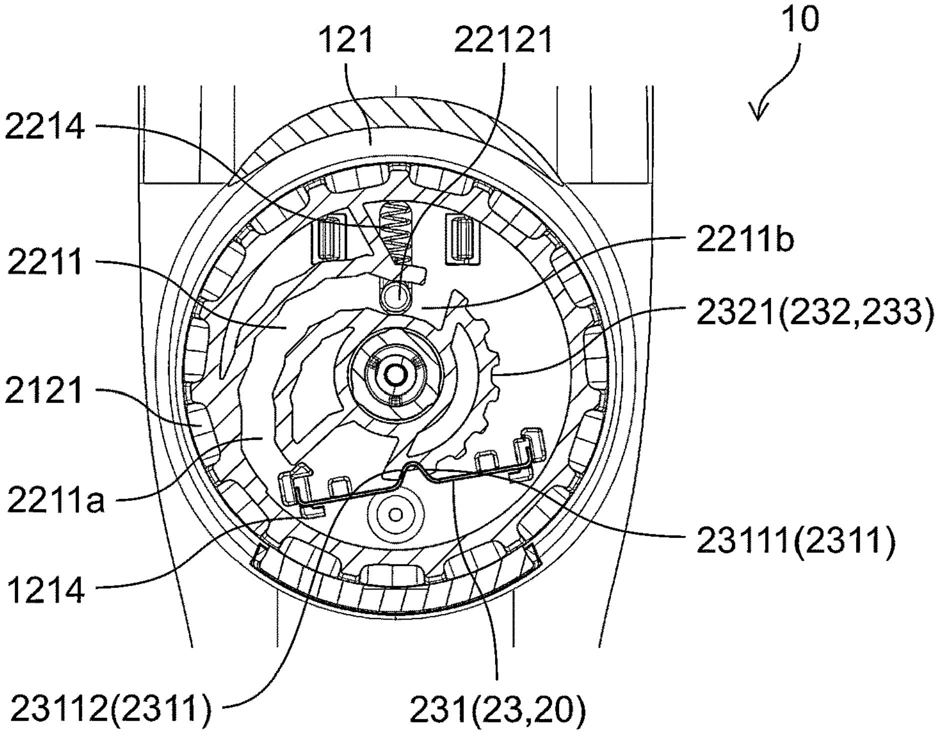
FIG. 13 is a diagram illustrating an example of the cutting height adjustment mechanism included in the hair clipper according to the exemplary embodiment, and is an enlarged plan view illustrating the inside of the dial in a state where the cutting height is minimized.

FIG. 12 is a diagram illustrating an example of cutting height adjustment mechanism 20 included in hair clipper 10 according to the exemplary embodiment, and is an enlarged plan view illustrating an inside of dial 21 in a state where the cutting height is maximized. FIG. 13 is a diagram illustrating an example of cutting height adjustment mechanism 20 included in hair clipper 10 according to the exemplary embodiment, and is an enlarged plan view illustrating the inside of dial 21 in a state where the cutting height is minimized. As illustrated in FIGS. 10 to 13, cutting height adjustment mechanism 20 includes dial 21 for cutting height adjustment rotatably attached to main body 11, and transmission mechanism 22 that performs the standing and falling operation of switching lever 44 of blade block 40 in conjunction with the rotation of dial 21. In the present exemplary embodiment, dial 21 for adjusting a cutting height is provided close to blade block 40 (that is, close to the lower side of FIG. 1) with respect to operation switch 12*a* on a front surface side of housing 12, that is, between grip 11*a* of main body 11 and blade part 45 in a state of being rotatable relative to housing 12. At this time, dial 21 can be relatively rotated with respect to housing 12 about rotation axis C1 extending in a left-right direction (that is, in a horizontal direction) in the state illustrated in FIG. 10.

In the present exemplary embodiment, dial disposition part 121 is formed to be recessed inward between grip 11*a* of main body 11 and blade part 45, and dial 21 is disposed on dial disposition part 121.

Figure 14:
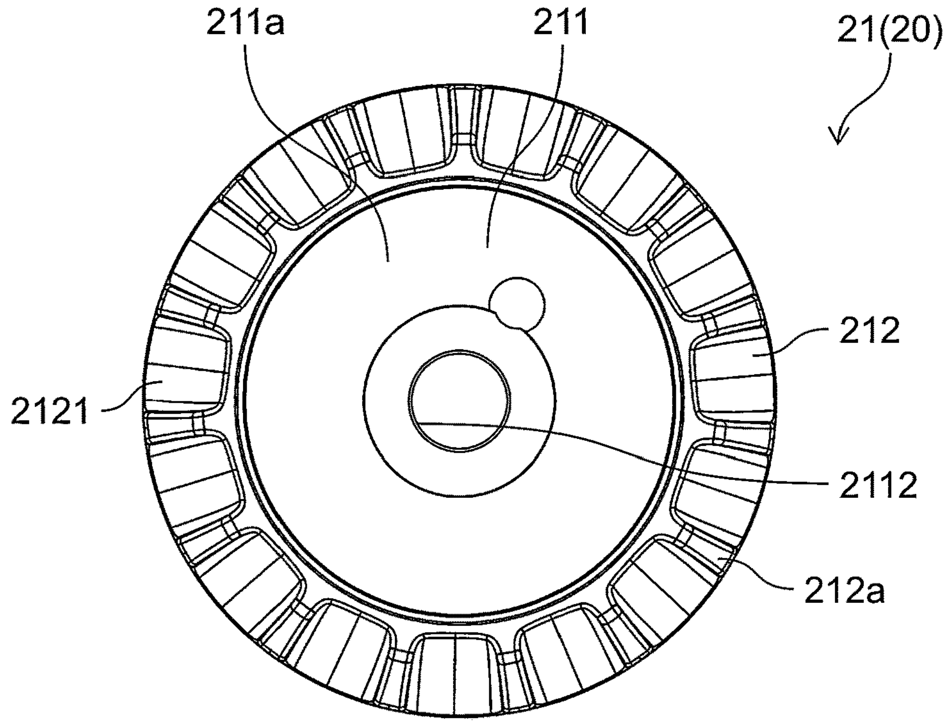
FIG. 14 is a plan view illustrating an example of the dial according to the exemplary embodiment.
Figure 15:
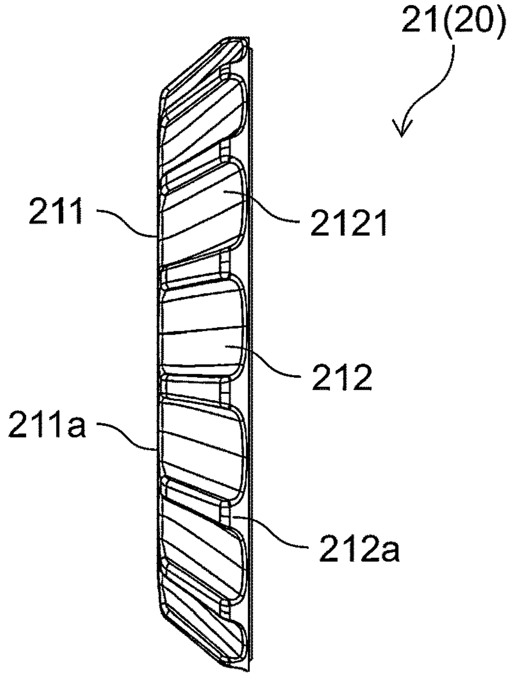
FIG. 15 is a side view illustrating an example of the dial according to the exemplary embodiment.
Figure 16:
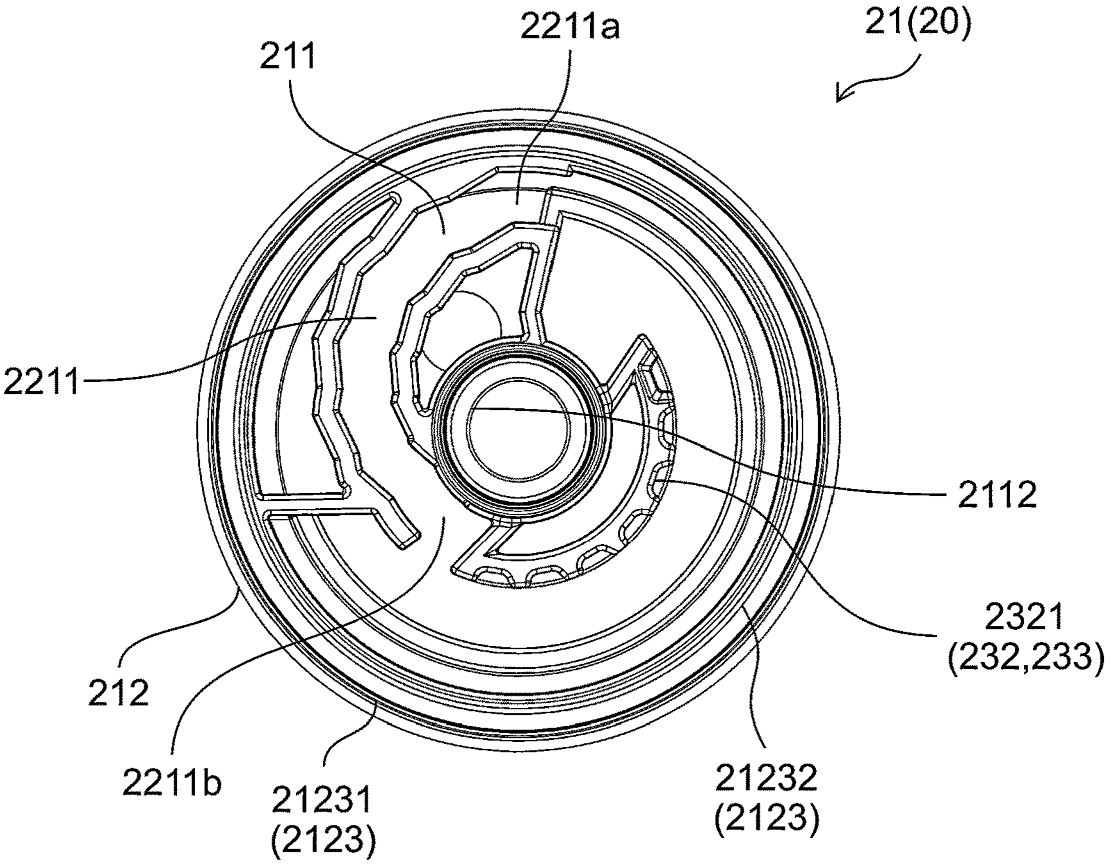
FIG. 16 is a rear view illustrating an example of the dial according to the exemplary embodiment.

FIG. 14 is a plan view illustrating an example of dial 21 according to the exemplary embodiment. FIG. 15 is a side view illustrating an example of dial 21 according to the exemplary embodiment. FIG. 16 is a rear view illustrating an example of dial 21 according to the exemplary embodiment. As illustrated in FIGS. 2 to 4 and FIGS. 14 to 16, dial 21 includes top wall 211 having a substantially disk shape, and peripheral wall 212 extending from an outer peripheral edge of top wall 211 toward housing 12 (more specifically, toward dial disposition part 121).

Furthermore, on the back side of top wall 211 (that is, the side facing surface 121*a* of dial disposition part 121), bearing 2111 in which substantially cylindrical support shaft 1211 formed in dial disposition part 121 is fitted is formed. In the present exemplary embodiment, bearing 2111 also has a substantially cylindrical shape, and through-hole 2112 penetrating in a thickness direction of top wall 211 is formed in a central portion of bearing 2111.

Furthermore, in the present exemplary embodiment, hair clipper 10 (that is, an example of the cutting device) includes cover 30 that covers a part of dial 21 in a state where rotation of dial 21 is permitted, and substantially cylindrical support shaft 311 formed on cover 30 is inserted into through-hole 2112. Thus, cover 30 and dial 21 are attached to housing 12.

Figure 22:
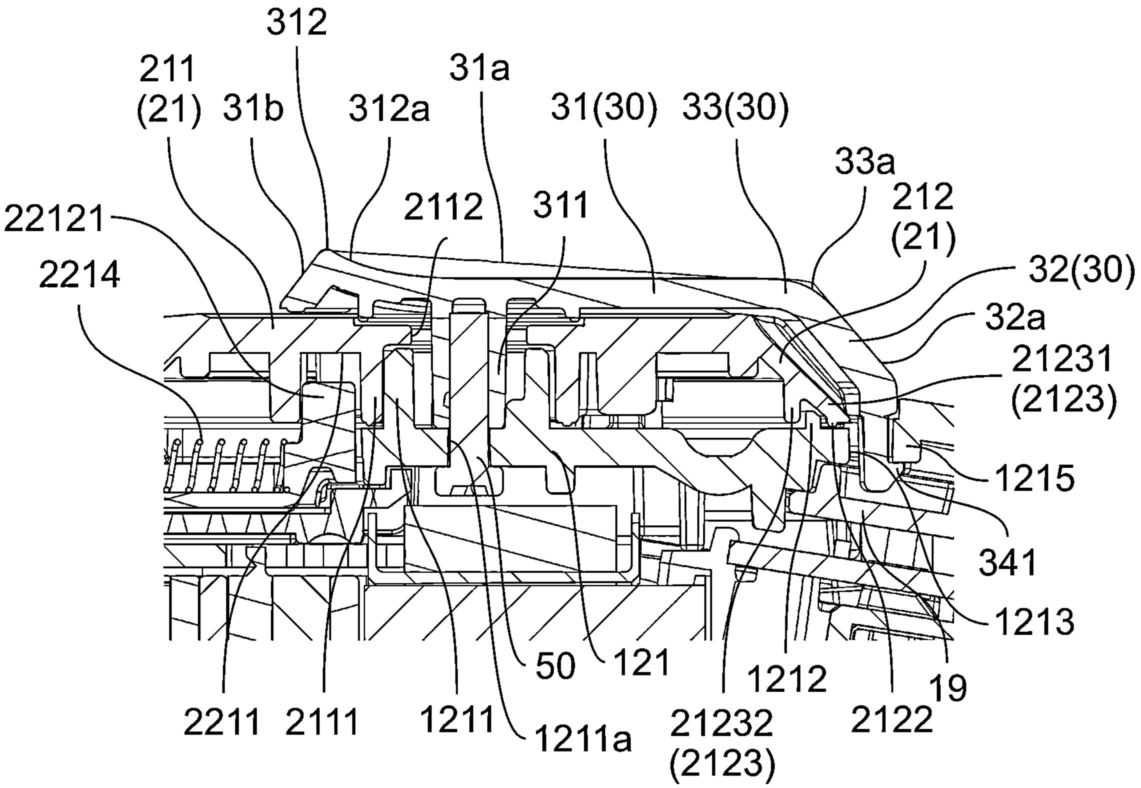
FIG. 22 is an enlarged cross-sectional view illustrating the cover included in the hair clipper according to the exemplary embodiment.

Specifically, through-hole 1211*a* penetrating in a thickness direction of housing 12 is also formed in a central portion of support shaft 1211 in dial disposition part 121. FIG. 22 is an enlarged cross-sectional view illustrating cover 30 included in hair clipper 10 according to the exemplary embodiment. When cover 30 and dial 21 are attached to housing 12, as illustrated in FIG. 22, support shaft 1211 formed in dial disposition part 121 is fitted into through-hole 2112 formed in the top wall 211, and support shaft 311 formed in cover 30 is inserted into through-hole 2112. At this time, a distal end of support shaft 311 faces a peripheral edge of through-hole 1211*a*. Then, by fixing support shaft 311 to dial disposition part 121 with attachment screw 50 in a state where the distal end of support shaft 311 faces the peripheral edge of through-hole 1211*a*, cover 30 is fixed to housing 12, and dial 21 is rotatably attached to housing 12 and cover 30.

Moreover, in the present exemplary embodiment, scale 2113 is provided on an outer peripheral part of top surface 211*a* of top wall 211. Scale 2113 can be formed by displaying a numerical value of the cutting height on the outer peripheral part of top surface 211*a* of top wall 211. This numerical value can be displayed by, for example, engraving or printing. As illustrated in FIG. 2, mark line 313 is formed on distal end surface 31*b* of cover 30, and a current cutting height can be recognized by visually checking a numerical value indicated by mark line 313. Note that, in the drawing, scale 2113 is represented by a black circle without showing a specific numerical value.

On the other hand, a plurality of uneven parts 2121 are formed along a circumferential direction on peripheral surface 212*a* of peripheral wall 212. Such uneven parts 2121 can be formed by knurling, for example. When dial 21 is operated, the operation can be performed while a finger is hooked on uneven part 2121. In this way, dial 21 can be operated more easily.

Furthermore, protrusion 2122 protruding toward surface 121*a* of dial disposition part 121 is formed at a distal end of peripheral wall 212 (more specifically, a distal end facing housing 12). Note that predetermined clearance S1 is formed between the distal end of protrusion 2122 and surface 121*a* of dial disposition part 121. This prevents dial 21 and housing 12 from interfering with each other when dial 21 is operated. The size of clearance S1 formed at this time is preferably set to a size that can prevent entry of hair chips H (that is, an example of the shavings) into dial 21 as much as possible without impairing rotational operability of dial 21.

Here, in the present exemplary embodiment, transmission mechanism 22 is accommodated in the cavity formed inside housing 12, and includes first conversion mechanism 221 and second conversion mechanism 222.

First conversion mechanism 221 is a mechanism that converts the rotation (that is, reciprocating rotational motion) of dial 21 about rotation axis C1 into a reciprocating linear motion of dial 21 in the radial direction (as an example, in the vertical direction in the state illustrated in FIG. 10). First conversion mechanism 221 includes groove 2211. As illustrated in FIGS. 12 and 13, groove 2211 is formed inside dial 21, and has a curved shape such that a distance from rotation axis C1 decreases from one end 2211*a* toward the other end 2211*b*.

Furthermore, first conversion mechanism 221 includes rod 2212 including pin 22121 movably inserted into groove 2211, and slider 2213 provided at a distal end of rod 2212. When dial 21 is rotated, pin 22121 moves in groove 2211 in conjunction with the rotation of dial 21. In this way, rod 2212 and slider 2213 reciprocate linearly in the radial direction of dial 21 (as an example, in the vertical direction in the state illustrated in FIG. 10) in conjunction with the movement of pin 22121 in groove 2211.

Moreover, in the present exemplary embodiment, coil spring 2214 is attached to rod 2212, and pin 22121 is biased toward the other end 2211*b* in groove 2211 by coil spring 2214. In this way, a load required for rotating dial 21 counterclockwise is reduced.

On the other hand, second conversion mechanism 222 is a mechanism that converts the reciprocating linear motion converted by first conversion mechanism 221 into rotation (that is, reciprocating rotational motion) about a rotation axis extending in the width direction (that is, one direction). Second conversion mechanism 222 includes operation shaft 2221. Operation shaft 2221 is attached to hook part 22131 provided in slider 2213 in a state of extending in the width direction (that is, one direction), and reciprocates linearly in the radial direction of dial 21 (as an example, in the vertical direction in the state illustrated in FIG. 10) together with slider 2213.

Moreover, second conversion mechanism 222 includes rotation member 2222 having one end connected to operation shaft 2221, and rotation axis 2223 extending in the width direction (that is, one direction) and to which rotation member 2222 is rotatably attached. In the present exemplary embodiment, a pair of rotation members 2222 is provided from both ends in the width direction (that is, one direction) of operation shaft 2221. Furthermore, second conversion mechanism 222 includes action member 2224 connected to the other end of rotation member 2222 to perform the standing and falling operation of switching lever 44.

When operation shaft 2221 is linearly reciprocated in the radial direction of dial 21 (as an example, in the vertical direction in the state illustrated in FIG. 10), rotation member 2222 rotates about rotation axis 2223 in conjunction with the linear reciprocation of operation shaft 2221. As a result, action member 2224 connected to rotation member 2222 rotates in conjunction with the other end of rotation member 2222, and the standing and falling operation of switching lever 44 is performed by the rotation of action member 2224.

In the present exemplary embodiment, in a case where dial 21 is rotated counterclockwise, slider 2213 and operation shaft 2221 linearly move downward in the state illustrated in FIGS. 10 and 11. With the downward movement of operation shaft 2221, rotation member 2222 rotates about rotation axis 2223. At this time, rotation member 2222 rotates so that one end side connected to operation shaft 2221 moves downward and the other end to which action member 2224 is connected moves upward. Furthermore, action member 2224 moves upward along with the upward movement of the other end side of rotation member 2222. Then, by moving action member 2224 upward, switching lever 44 is rotated to the standing attitude against a biasing force of push-up spring 43. In this way, movable blade 46 slides toward the distal end side (that is, the front side in the front-rear direction) while holding the pressed state with respect to fixed blade 47 via push-up spring 43 and guide plate 42.

On the other hand, in a case where dial 21 is rotated clockwise, slider 2213 and operation shaft 2221 linearly move upward in the state illustrated in FIGS. 10 and 11. Along with the upward movement of operation shaft 2221, rotation member 2222 rotates about rotation axis 2223. At this time, rotation member 2222 rotates so that one end side connected to operation shaft 2221 moves upward and the other end to which action member 2224 is connected moves downward. Furthermore, action member 2224 moves downward along with the downward movement of the other end side of rotation member 2222. Then, by moving action member 2224 downward, switching lever 44 is rotated to the falling attitude by a biasing force of push-up spring 43. In this way, movable blade 46 slides toward the base side (that is, the rear side in the front-rear direction) while holding the pressed state with respect to fixed blade 47 via push-up spring 43 and guide plate 42.

As described above, in the present exemplary embodiment, in a case where dial 21 is rotated counterclockwise, movable blade 46 slide toward the distal end side of fixed blade 47, and in a case where dial 21 is rotated clockwise, movable blade 46 slide toward the base side of fixed blade 47. Note that, in the present exemplary embodiment, rotating dial 21 counterclockwise means rotating dial 21 counterclockwise in the state illustrated in FIG. 2, and rotating dial 21 clockwise means rotating dial 21 clockwise in the state illustrated in FIG. 2.

At this time, fixed blade 47 have a tapered shape in which the distal end thereof is narrowed, and movable blade 46 slide on tapered fixed blade 47. That is, in the present exemplary embodiment, movable blade 46 are slid between the base side and the distal end on tapered fixed blade 47. In this way, the cutting height of the hair is changed.

Note that, in the present exemplary embodiment, when dial 21 is rotated counterclockwise to rotate switching lever 44 by a predetermined amount from the initial position toward the standing attitude, protrusion 44*d* comes into contact with hook part 41*a* of fixing plate 41 to restrict further rising. That is, by bringing protrusion 44*d* into contact with hook part 41*a* of fixing plate 41 to regulate further standing of switching lever 44, sliding of movable blade 46 toward the distal end is regulated. Furthermore, in the present exemplary embodiment, when switching lever 44 is at the initial position, movable blade 46 is located closest to the base side of fixed blade 47 (that is, in a state where the cutting height is set to be the highest). When the standing of switching lever 44 is regulated by protrusion 44*d*, movable blade 46 is located closest to the distal end of fixed blade 47 (that is, in a state where the cutting height is set to be the shortest).

Furthermore, movable blade 46 includes main body 461, a plurality of movable blade bars 462 juxtaposed in the width direction on one end side (that is, on the front side in the front-back direction) of main body 461, and a plurality of movable blade grooves 463 formed between adjacent movable blade bars 462.

On the other hand, fixed blade 47 include main body 471, a plurality of fixed blade bars 472 arranged side by side in the width direction on one end side (that is, on the front side in the front-back direction) of main body 471, and a plurality of fixed blade grooves 473 formed between adjacent fixed blade bars 472. Fixed blade bars 472 each have a tapered portion that tapers toward the distal end thereof (that is, toward the front side in the front-back direction).

In the present exemplary embodiment, the tapered portion is formed such that a cutting height in a state where movable blade 46 are located on the closest to the base side of fixed blade 47 is 2.0 mm, and a cutting height in a state where movable blade 46 are located on the closest to the base side of fixed blade 47 is 0.8 mm. By operating dial 21 for adjusting a cutting height, the cutting height can be set to a plurality of levels between 2.0 mm and 0.8 mm.

Specifically, cutting height adjustment mechanism 20 includes holding mechanism 23 capable of holding dial 21 in a stepwise manner. Holding mechanism 23 holds dial 21 in a stepwise manner so that the cutting height can be changed in a stepwise manner.

In the present exemplary embodiment, holding mechanism 23 includes holding spring 231 fixed to fixing part 1214 provided in main body 11, and engaged part 232 formed on the back side of dial 21 and capable of engaging with holding spring 231. Furthermore, dial 21 can be relatively rotated with respect to holding spring 231, and engaged part 232 formed on the back side of dial 21 can also be relatively rotated with respect to holding spring 231. When dial 21 is rotated and the relative position between holding spring 231 and engaged part 232 becomes a predetermined position, holding spring 231 and engaged part 232 are releasably engaged, so that the rotation of dial 21 in both directions is prevented.

Specifically, engaged part 232 is formed to have a shape including an arc centered on rotation axis C1. A plurality of engagement recesses 2321 (that is, an example of the recess) recessed toward rotation axis C1 are formed on the peripheral surface of engaged part 232 at equal intervals along the circumferential direction. On the other hand, holding spring 231 is formed with engagement protrusion 2311 (that is, an example of the protrusion part) that protrudes toward the peripheral surface of engaged part 232 and engages with engagement recess 2321 of engaged part 232.

As described above, in the present exemplary embodiment, the positions of holding spring 231 and engaged part 232 in a state where any one of engagement recesses 2321 of seven engagement recesses 2321 faces engagement protrusion 2311 are the predetermined positions described above.

Note that the cutting height can be continuously changed between 2.0 mm and 0.8 mm. Furthermore, the upper limit and the lower limit of the cutting height can also be appropriately set. Moreover, in the case of changing in a stepwise manner, any number of stages may be used as long as the number of stages is two or more, and it is not necessary to set the number of stages to seven.

Furthermore, cutting height adjustment mechanism 20 described above is merely an example, and other conventionally known cutting height adjustment mechanisms can be used as long as movable blade 46 can be slid in the front-rear direction with respect to fixed blade 47 according to the operation of the user.

As described above, in the present exemplary embodiment, when dial 21 is rotated in the counterclockwise direction, switching lever 44 is rotated toward the standing attitude side against the biasing force of push-up spring 43, and the required load becomes larger in the case of rotating dial 21 in the counterclockwise direction than in the case of rotating dial 21 in the clockwise direction.

Therefore, in the present exemplary embodiment, pin 22121 is biased toward other end 2211*b* side in groove 2211 by coil spring 2214. In this way, a load required for rotating dial 21 counterclockwise is reduced.

However, even if coil spring 2214 is provided, there is a difference in load required for rotation between a case where dial 21 is rotated counterclockwise and a case where dial 21 is rotated clockwise. Therefore, in the configuration of conventional cutting height adjustment mechanism 20, it is difficult to further improve the operability of dial 21.

Therefore, in the present exemplary embodiment, the operability of dial 21 can be further improved.

Specifically, cutting height adjustment mechanism 20 includes holding mechanism 23 capable of holding dial 21 in a stepwise manner, and holding mechanism 23 includes engagement recess 2321 (that is, an example of the recess) and engagement protrusion 2311 (that is, an example of the protrusion part) that are releasably engaged. At least one of engagement recess 2321 (that is, an example of the recess) and engagement protrusion 2311 (that is, an example of the protrusion part) includes irregularly-shaped engagement part 233 having different shapes on one side and the other side in the rotation direction of dial 21.

In the present exemplary embodiment, each of seven engagement recesses 2321 (that is, an example of the recess) formed in dial 21 is irregularly-shaped engagement part 233 having a different shape on one side and the other side in the rotation direction of dial 21.

Figure 17:
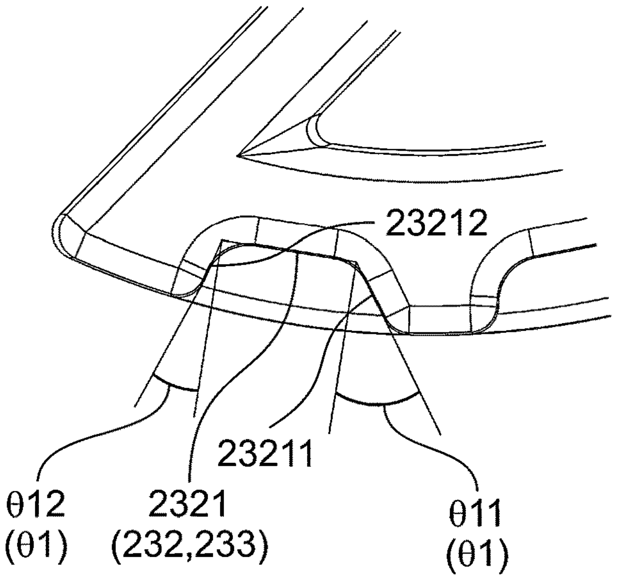
FIG. 17 is an enlarged view illustrating an engagement recess formed in the dial according to the exemplary embodiment.

FIG. 17 is an enlarged view illustrating engagement recess 2321 formed in dial 21 according to the exemplary embodiment. Specifically, as illustrated in FIG. 17, in engagement recess 2321 (that is, an example of the recess) as irregularly-shaped engagement part 233, inclination angle θ1 is made different between one side and the other side in the rotation direction of dial 21. In the present exemplary embodiment, a difference between a load required for rotating dial 21 to one side and a load required for rotating dial 21 to the other side is smaller than that of a case where shapes of one side and the other side in a rotation direction of dial 21 are the same as each other. That is, engagement recess 2321 (that is, an example of the recess) is formed such that inclination angle θ11 of first inclined surface 23211 positioned on the side where dial 21 is rotated so that the cutting height becomes low is larger than inclination angle θ12 of second inclined surface 23212 positioned on the side where dial 21 is rotated so that the cutting height becomes high.

This configuration reduces a difference between a load required for rotating dial 21 to one side and a load required for rotating dial 21 to the other side, thereby further improving operability of dial 21.

Note that, in the present exemplary embodiment, first inclined surface 23111 located on one side and second inclined surface 23112 located on the other side of engagement protrusion 2311 (that is, an example of the protrusion part) have the same shape as each other, but not only engagement recess 2321 (that is, an example of the recess) but also inclination angle θ1 of engagement protrusion 2311 (that is, an example of the protrusion part) can be made different. Furthermore, the shapes of engagement recesses 2321 (that is, an example of the recess) may be the same as each other, and inclination angles θ1 on both sides in the rotation direction of engagement protrusions 2311 (that is, an example of the protrusion part) may be made different from each other.

In this way, only by making inclination angle θ1 different, it is possible to reduce a difference between a load required for rotating dial 21 to one side and a load required for rotating dial 21 to the other side, so that the load of dial 21 can be set more easily.

Furthermore, it is also possible to make a load necessary for rotating dial 21 to one side and a load necessary for rotating dial 21 to the other side substantially the same as each other. As described above, when an operation force of dial 21 for increasing the cutting height and the operation force of dial 21 for decreasing the cutting height are substantially the same as each other, the operability of dial 21 can be further improved.

Figure 18:
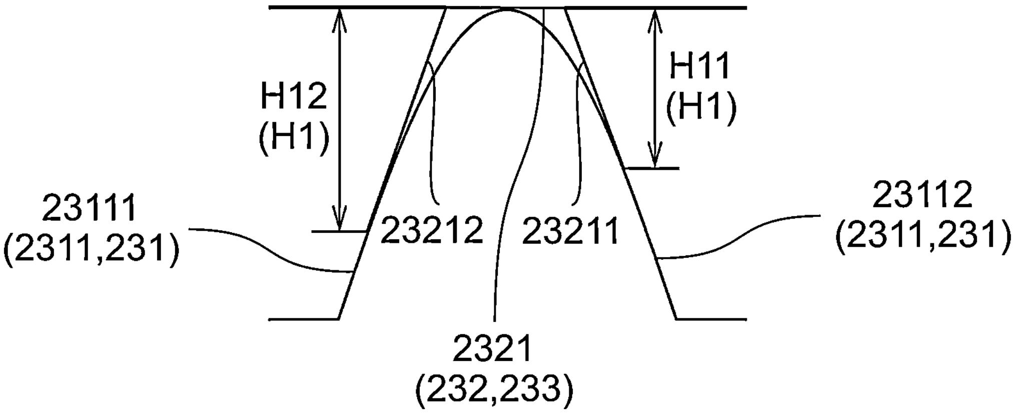
FIG. 18 is a diagram illustrating a first modification of the engagement recess and an engagement protrusion included in the hair clipper according to the exemplary embodiment.

FIG. 18 is a diagram illustrating a first modification of engagement recess 2321 and engagement protrusion 2311 included in hair clipper 10 according to the exemplary embodiment. As illustrated in FIG. 18, by making climbing height H1 different between one side and the other side in the rotation direction of dial 21, it is also possible to serve engagement recess 2321 (that is, an example of the recess) as the irregularly-shaped engagement part 233.

For example, as illustrated in FIG. 18, engagement recess 2321 (that is, an example of the recess) can be formed such that climbing height H11 on a side where dial 21 is rotated so that the cutting height becomes low is lower than climbing height H12 on a side where dial 21 is rotated so that the cutting height becomes high. In this case, the height from the top of engagement protrusion 2311 (that is, an example of the protrusion part) to the base ends on both sides in the rotation direction is climbing height H1.

In this case, only by varying climbing height H1, a difference between a load required for rotating dial 21 to one side and a load required for rotating dial 21 to the other side can be reduced. Accordingly, the load of dial 21 can be set more easily.

Furthermore, it is also possible to make a load necessary for rotating dial 21 to one side and a load necessary for rotating dial 21 to the other side substantially the same as each other. As described above, when an operation force of dial 21 for increasing the cutting height and the operation force of dial 21 for decreasing the cutting height are substantially the same as each other, the operability of dial 21 can be further improved.

Note that, also in FIG. 18, first inclined surface 23111 located on one side and second inclined surface 23112 located on the other side of engagement protrusion 2311 (that is, an example of the protrusion part) have the same shape as each other, but not only climbing height H1 of engagement recess 2321 (that is, an example of the recess) but also climbing height H1 of engagement protrusion 2311 (that is, an example of the protrusion part) can be made different from each other. Furthermore, the shapes of engagement recesses 2321 (that is, an example of the recess) may be the same as each other, and climbing heights H1 on both sides in the rotation direction of engagement protrusions 2311 (that is, an example of the protrusion part) may be made different from each other.

Figure 19:
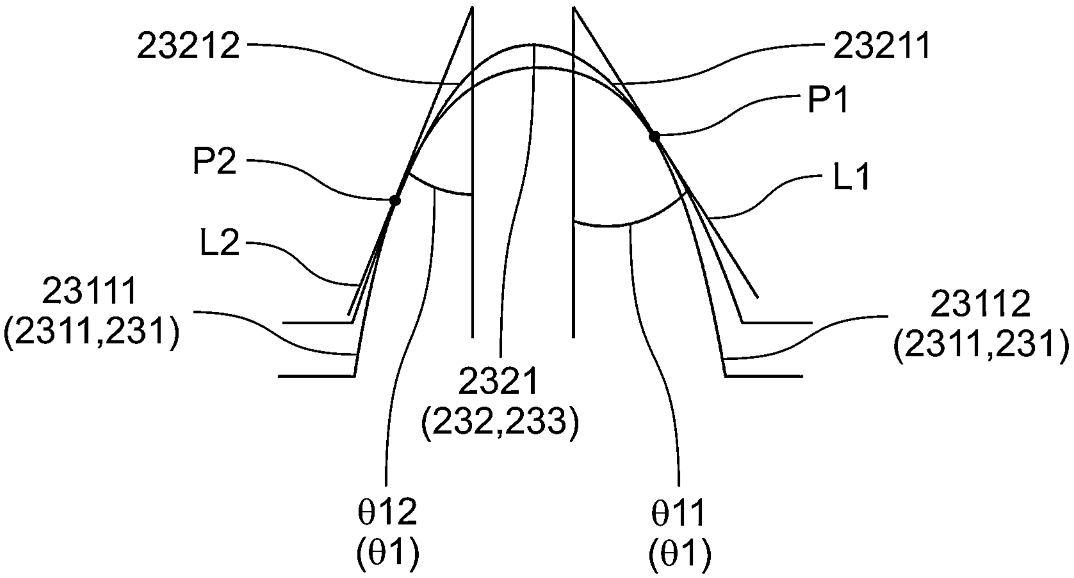
FIG. 19 is a diagram illustrating a second modification of the engagement recess and the engagement protrusion included in the hair clipper according to the exemplary embodiment.
Figure 20:
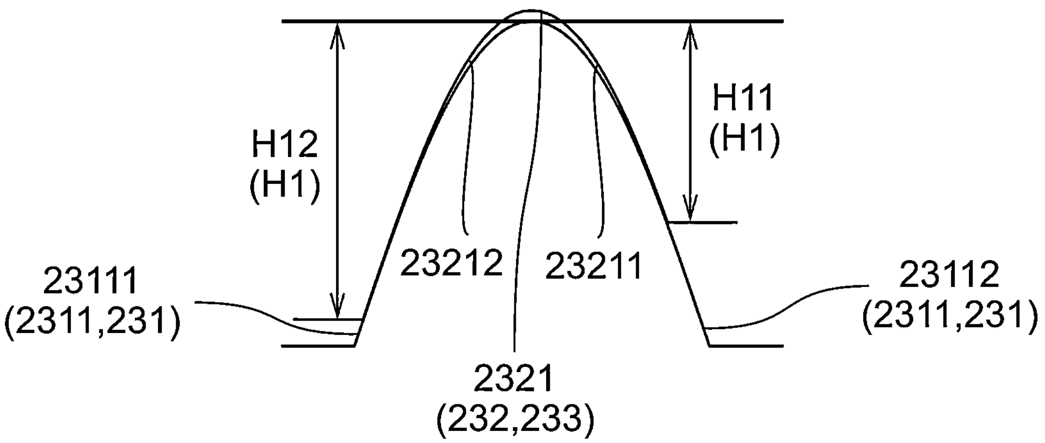
FIG. 20 is a diagram illustrating a third modification of the engagement recess and the engagement protrusion included in the hair clipper according to the exemplary embodiment.

FIG. 19 is a diagram illustrating a second modification of engagement recess 2321 and engagement protrusion 2311 included in hair clipper 10 according to the exemplary embodiment. FIG. 20 is a diagram illustrating a third modification of engagement recess 2321 and engagement protrusion 2311 of hair clipper 10 according to the exemplary embodiment. As illustrated in FIGS. 19 and 20, engagement recess 2321 (that is, an example of the recess) and engagement protrusion 2311 (that is, an example of the protrusion part) may be formed as curved surfaces.

Even in such a case, as illustrated in FIG. 19, by making inclination angles θ1 on both sides in the rotation direction of engagement recess 2321 (that is, an example of the recess) different from each other, it is possible to reduce a difference between a load required when dial 21 is rotated to one side and a load required when dial 21 is rotated to the other side.

When engagement recess 2321 (that is, an example of the recess) is formed of a curved surface as described above, inclination angles θ1 (more specifically, inclination angle θ11 on one side and inclination angle θ12 on the other side) of the tangent lines (more specifically, tangent line L1 on one side and tangent line L2 on the other side) passing through the contact points (more specifically, contact P1 on one side and contact P2 on the other side) between engagement recess 2321 (that is, an example of the recess) and engagement protrusion 2311 (that is, an example of the protrusion part) may be made different from each other. That is, engagement recess 2321 (that is, an example of the recess) may be formed such that inclination angle θ11 of tangent line L1 located on the side where dial 21 is rotated so that the cutting height becomes low is larger than inclination angle θ12 of tangent line L2 located on the side where dial 21 is rotated so that the cutting height becomes high.

Furthermore, as illustrated in FIG. 20, the difference between the load necessary for rotating dial 21 to one side and the load necessary for rotating dial 21 to the other side can be reduced by making climbing heights H1 on both sides in the rotation direction of engagement recesses 2321 (that is, an example of the recess) different from each other.

In this case, as in FIG. 18, the height from the top of engagement protrusion 2311 (that is, an example of the protrusion part) to the base ends on both sides in the rotation direction is climbing height H1.

Note that, also in FIG. 19, first inclined surface 23111 located on one side and second inclined surface 23112 located on the other side of engagement protrusion 2311 (that is, an example of the protrusion part) have the same shape as each other, but not only inclination angle θ1 of engagement recess 2321 (that is, an example of the recess) but also inclination angle θ1 of engagement protrusion 2311 (that is, an example of the protrusion part) can be made different from each other. Furthermore, the shapes of engagement recesses 2321 (that is, an example of the recess) may be the same as each other, and inclination angles θ1 on both sides in the rotation direction of engagement protrusions 2311 (that is, an example of the protrusion part) may be made different from each other.

Furthermore, also in FIG. 20, first inclined surface 23111 located on one side and second inclined surface 23112 located on the other side of engagement protrusion 2311 (that is, an example of the protrusion part) have the same shape as each other, but not only climbing height H1 of engagement recess 2321 (that is, an example of the recess) but also climbing height H1 of engagement protrusion 2311 (that is, an example of the protrusion part) can be made different from each other. Furthermore, the shapes of engagement recesses 2321 (that is, an example of the recess) may be the same as each other, and climbing heights H1 on both sides in the rotation direction of engagement protrusions 2311 (that is, an example of the protrusion part) may be made different from each other.

Furthermore, it is also possible to form irregularly-shaped engagement part 233 by making shapes of one side and the other side in the rotation direction of dial 21 different from each other such that a difference between a load required when dial 21 is rotated to one side and a load required when dial 21 is rotated to the other side is larger than that of a case where shapes of one side and the other side in the rotation direction of dial 21 are the same as each other.

Such irregularly-shaped engagement part 233 can be formed by applying the shapes illustrated in FIGS. 17 to 20.

As described above, when the difference between the load required for rotating dial 21 to one side and the load required for rotating dial 21 to the other side is increased, the load required for rotating dial 21 to one side and the load required for rotating dial 21 to the other side can be made more clearly different loads from each other. Therefore, whether dial 21 is operated to increase the cutting height or dial 21 is operated to decrease the cutting height can be recognized only by the operation of dial 21 without visually observing the scale.

In this manner, even when the movement direction of the dial can be recognized only by operating dial 21 without visual observation, the operability of dial 21 can be further improved.

Note that dial 21 may have a different shape of a portion touched by a finger. For example, dial 21 can be configured such that portions having different heights and widths of uneven part 2121 exist. Accordingly, the current cutting height can be recognized before rotating dial 21. However, for recognization of a difference from other parts only by touching with a finger, it is preferable that the shape is not changed at all cutting heights, but only the shape at a representative cutting height is different. For example, it is preferable that shapes in a state where the cutting height is the highest, a state where the cutting height is the lowest, and a state where the cutting height is the median value are different from each other. In this way, it is possible to more clearly recognize whether or not a state of a representative cutting height is present only by touching dial 21.

Also by using such dial 21, the operability of dial 21 can be further improved.

Furthermore, in the present exemplary embodiment, main body 11 is provided with cover 30 that covers a part of dial 21 in a state of permitting rotation of dial 21. Providing such cover 30 on main body 11 makes it possible to prevent erroneous operation of dial 21 when hair clipper 10 (that is, an example of the cutting device) are used, but it is preferable to more reliably prevent erroneous operation of dial 21.

Figure 21:
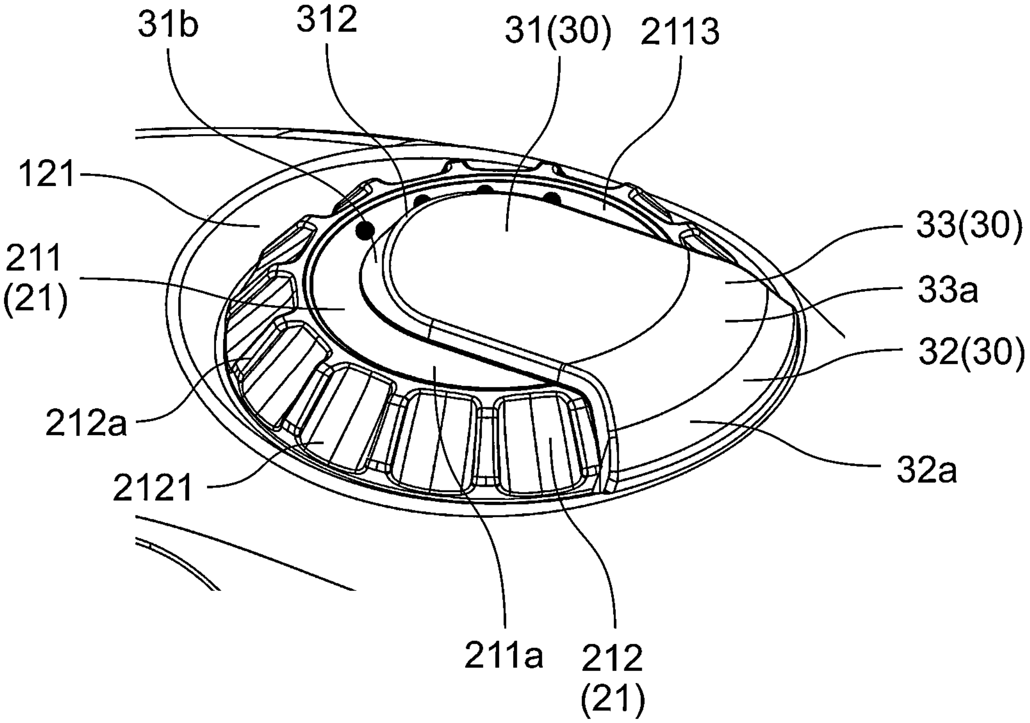
FIG. 21 is an enlarged perspective view illustrating a cover included in the hair clipper according to the exemplary embodiment.

Therefore, in the present exemplary embodiment, an erroneous operation of dial 21 can be more reliably prevented. FIG. 21 is an enlarged perspective view illustrating cover 30 included in hair clipper 10 according to the exemplary embodiment. Specifically, as illustrated in FIGS. 21 and 22, a grip side of dial 21 attached between grip 11*a* and blade part 45 in main body 11 is covered with cover 30.

Thus, cover 30 can prevent fingers from touching dial 21 when holding grip 11*a* and using hair clipper 10 (that is, an example of the cutting device). That is, when grip 11*a* is gripped and hair clipper 10 (that is, an example of the cutting device) are used, it is possible to prevent fingers from coming into contact with dial 21.

In the present exemplary embodiment, cover 30 includes top wall 31 that covers top surface 211*a* of dial 21, peripheral wall 32 that covers peripheral surface 212*a* on the grip side of dial 21, and coupling wall 33 that couples top wall 31 and peripheral wall 32.

Figure 31:
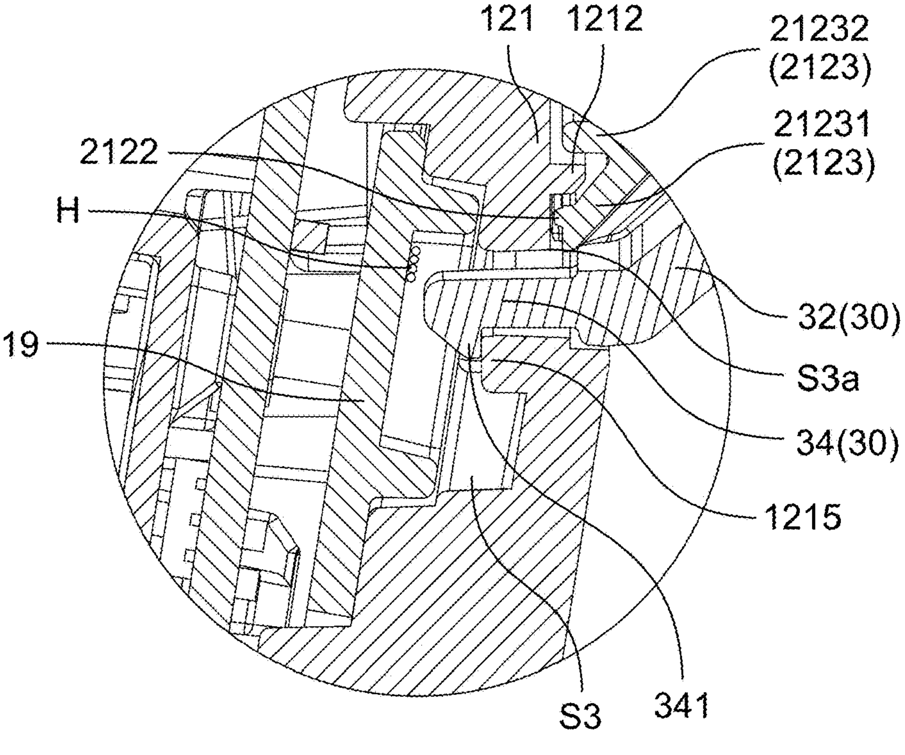
FIG. 31 is an enlarged view of part C in FIG. 4.

Furthermore, locking piece 34 is connected to the other end of peripheral wall 32, and slit 1213 into which locking piece 34 is inserted is formed in main body 11. FIG. 31 is an enlarged view of part C in FIG. 4. As illustrated in FIGS. 22 and 31, when cover 30 is attached to main body 11, locking piece 34 is inserted into slit 1213 formed in main body 11, and locking hook 341 formed in locking piece 34 is locked to locked part 1215 formed in the main body.

Thus, the grip side of peripheral surface 212*a* of dial 21 is covered with peripheral wall 32 of cover 30.

Note that, in the present exemplary embodiment, slit 1213 is formed along the circumferential direction on the grip side of dial disposition part 121, and locked part 1215 is formed on the side of the grip inside slit 1213. Thus, slit 1213 is covered with cover 30.

Furthermore, in the present exemplary embodiment, cover 30 has a plurality of types of surfaces (for example, top surface 31*a*, peripheral surface 32*a*, and coupling surface 33*a*). Note that the fact that the cover has a plurality of types of surfaces means that two or more surfaces having different at least one of the normal direction, the curvature, and the curved form of the curved surface (for example, whether the curved surface is a concave curved surface or a convex curved surface) are present on the surface of the cover. In the present exemplary embodiment, the surface of cover 30 is formed by a plurality of different types of surfaces such as top surface 31*a* which is a flat surface in which the normal direction is the direction of rotation axis C1, peripheral surface 32*a* which is a convex curved surface, and coupling surface 33*a* having a curvature different from that of peripheral surface 32*a*. In the present exemplary embodiment, the surface of cover 30 has such a shape obtained by combining a plurality of different types of surfaces, whereby hair clipper 10 (that is, an example of the cutting device) can be used in a plurality of ways of holding while preventing erroneous operation of dial 21.

Figure 23:
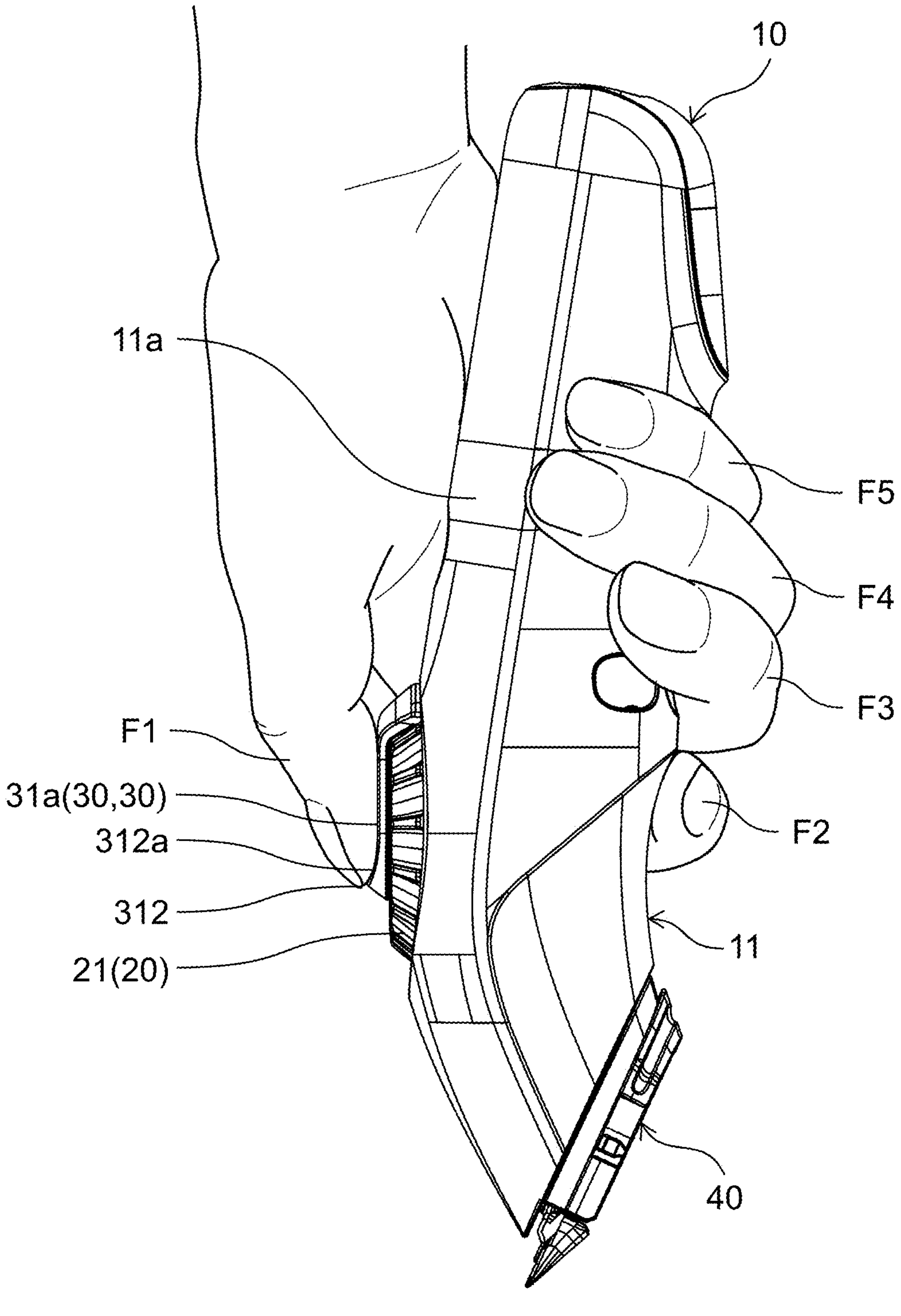
FIG. 23 is a diagram illustrating an example of a method of gripping the hair clipper according to the exemplary embodiment.

FIG. 23 is a diagram illustrating an example of a method of gripping hair clipper 10 according to the exemplary embodiment. As an example, hair clipper 10 (that is, an example of the cutting device) can be gripped by the method illustrated in FIG. 23. FIG. 23 illustrates how to grip and hold grip 11*a* with other fingers (index finger F2, middle finger F3, ring finger F4, and little finger F5) in a state where placing thumb F1 on top surface 31*a* in a state where the distal end is hooked on protrusion 312.

Note that protrusion 312 is formed at a distal end of top wall 31 which faces blade part 45 so as to protrude in a direction away from dial 21. Therefore, if thumb F1 is placed on top surface 31*a* in a state where the distal end is hooked to protrusion 312, it is possible to more reliably prevent thumb F1 placed on cover 30 from sliding toward blade part 45, and it is possible to prevent an erroneous operation of dial 21 more reliably.

Moreover, protrusion 312 is formed such that surface 312*a* on the side of grip 11*a* is a concave curved surface. In this way, it is possible to use hair clipper 10 (that is, an example of the cutting device) with a finger (for example, thumb F1) fitted to surface 312*a* (that is, the concave curved surface) of protrusion 312 on a side of grip 11*a*, and it is possible to further improve usability of hair clipper 10 (that is, an example of the cutting device).

Even in a case where hair clipper 10 (that is, an example of the cutting device) is gripped by such a method, it is possible to use hair clipper 10 (that is, an example of the cutting device) while preventing erroneous operation of dial 21.

Figure 24:
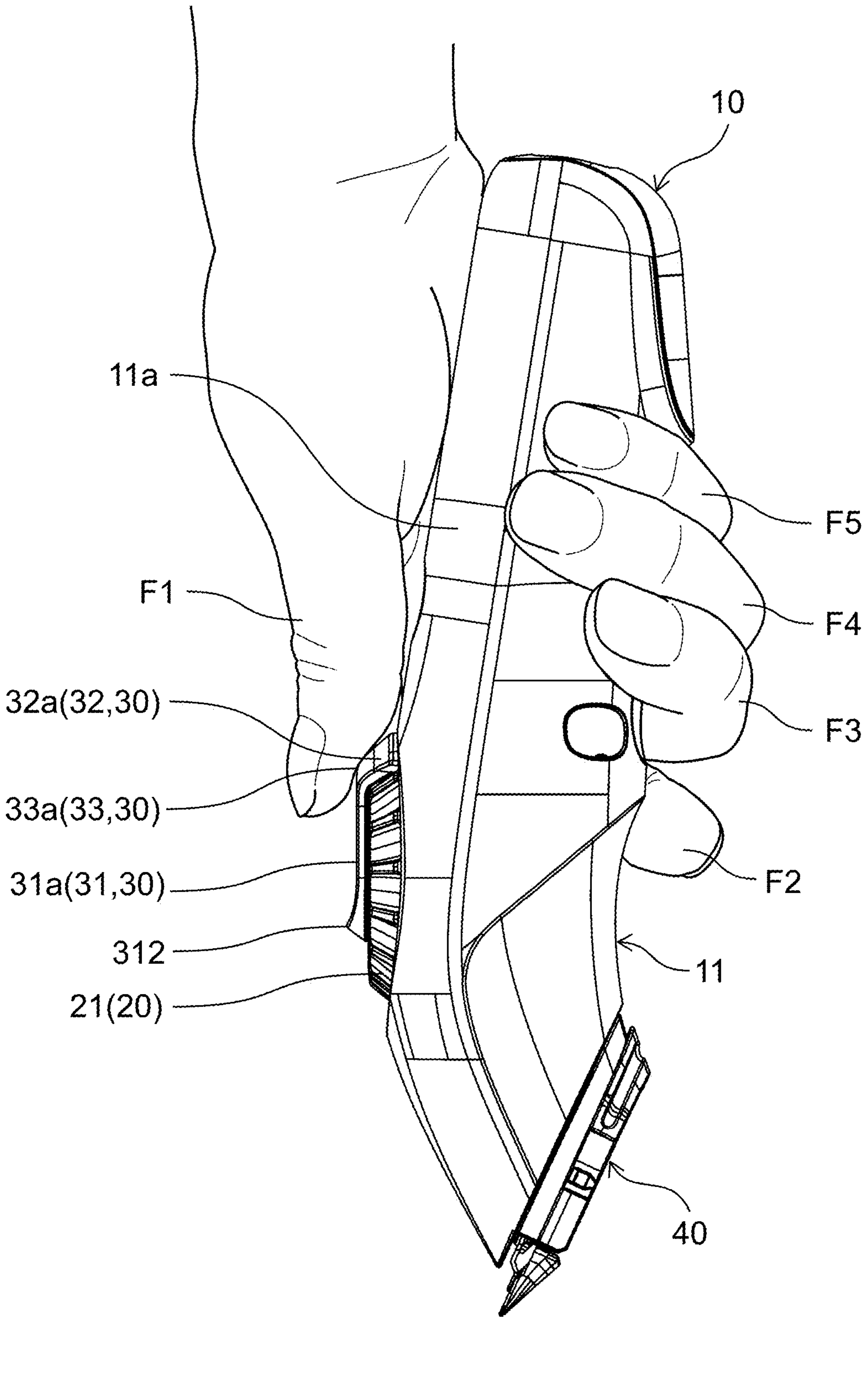
FIG. 24 is a diagram illustrating a first modification of the method of gripping the hair clipper according to the exemplary embodiment.

FIG. 24 is a diagram illustrating a first modification of the method of gripping hair clipper 10 according to the exemplary embodiment. By the method illustrated in FIG. 24, hair clipper 10 (that is, an example of the cutting device) can be gripped. FIG. 24 illustrates how to grip and hold grip 11*a* with other fingers (index finger F2, middle finger F3, ring finger F4, and little finger F5) while holding coupling surface 33*a* with thumb F1.

Even in a case where hair clipper 10 (that is, an example of the cutting device) is gripped by such a method, it is possible to use hair clipper 10 (that is, an example of the cutting device) while preventing erroneous operation of dial 21.

Note that coupling surface 33*a* of coupling wall 33 is a convex curved surface, and it is possible to further reduce the stimulation applied to the finger from coupling wall 33 when the finger is placed on coupling surface 33*a* of coupling wall 33 and used or when the finger comes into contact with coupling surface 33*a* of coupling wall 33. Accordingly, even in a case where hair clipper 10 are held as illustrated in FIG. 24, hair clipper (that is, an example of the cutting device) can be used for a longer period of time.

Figure 25:
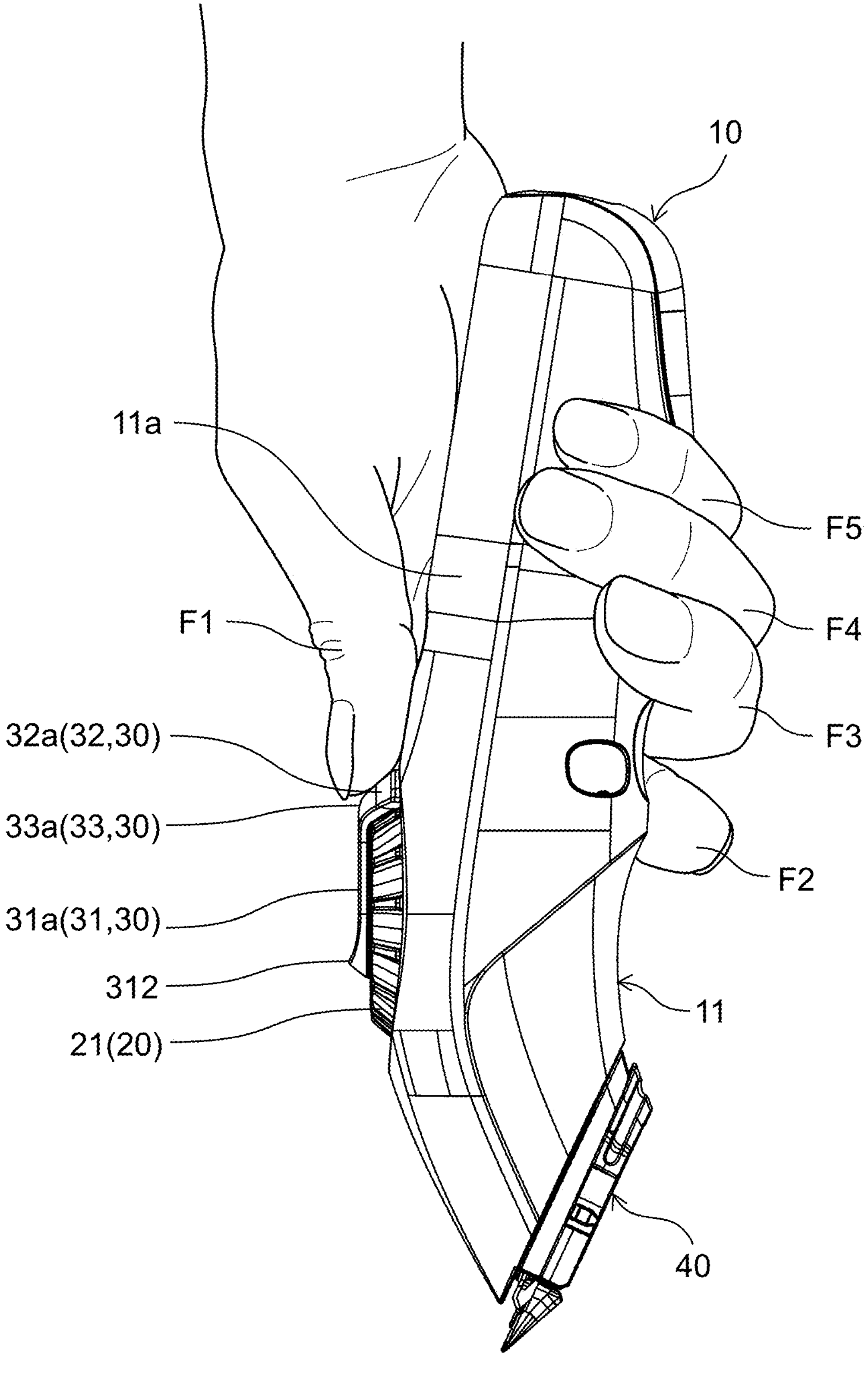
FIG. 25 is a diagram illustrating a second modification of the method of gripping the hair clipper according to the exemplary embodiment.

FIG. 25 is a diagram illustrating a second modification of the method of gripping hair clipper 10 according to the exemplary embodiment. By the method illustrated in FIG. 25, hair clipper 10 (that is, an example of the cutting device) can be gripped. FIG. 25 illustrates how to grip and hold grip 11*a* with other fingers (index finger F2, middle finger F3, ring finger F4, and little finger F5) while holding peripheral surface 32*a* with the distal end of thumb F1.

Even in a case where hair clipper 10 (that is, an example of the cutting device) is gripped by such a method, it is possible to use hair clipper 10 (that is, an example of the cutting device) while preventing erroneous operation of dial 21.

Figure 26:
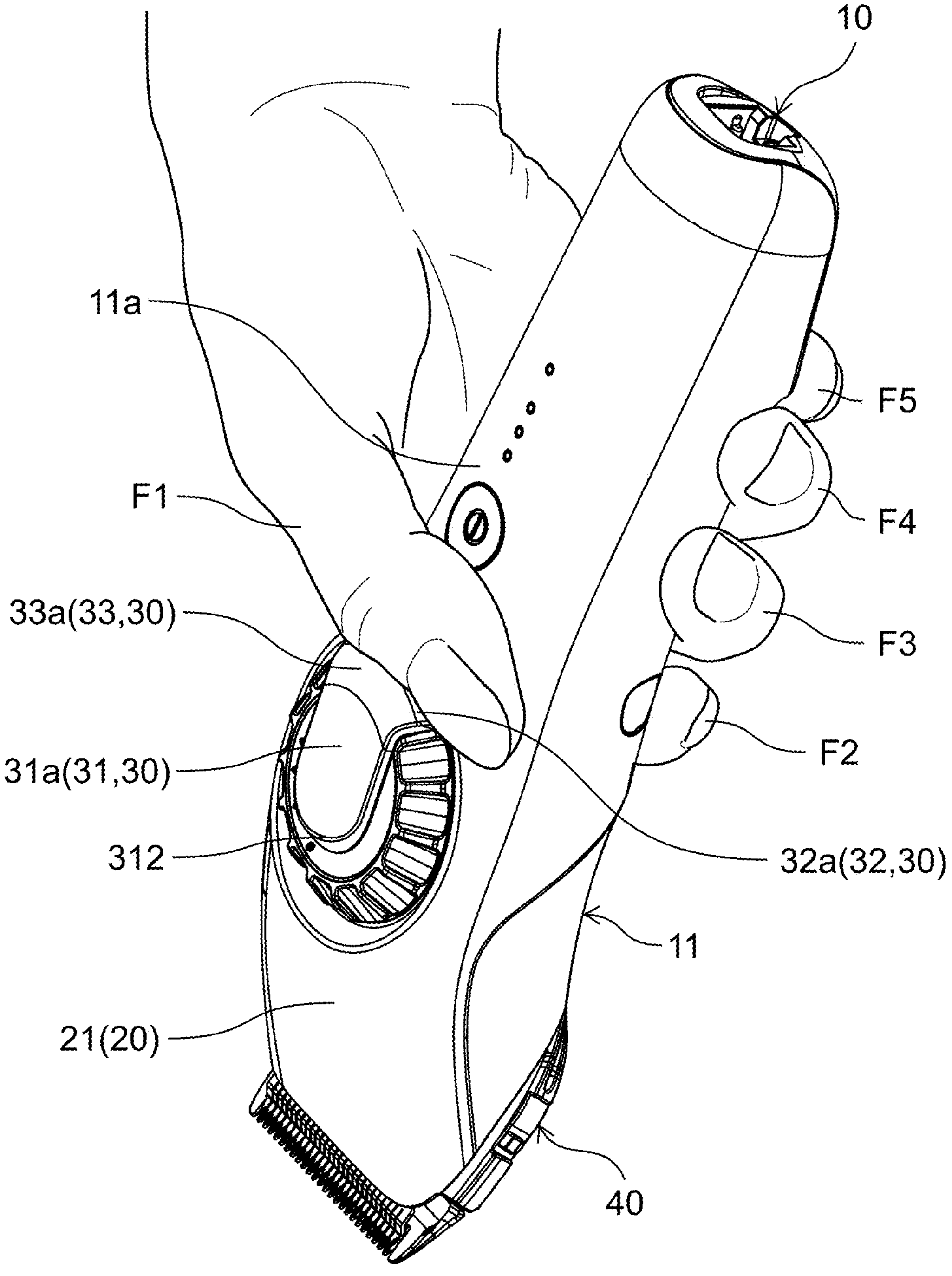
FIG. 26 is a diagram illustrating a third modification of the method of gripping the hair clipper according to the exemplary embodiment.

FIG. 26 is a diagram illustrating a third modification of the method of gripping hair clipper 10 according to the exemplary embodiment. By the method illustrated in FIG. 26, hair clipper 10 (that is, an example of the cutting device) can be gripped. FIG. 26 illustrates how to grip and hold grip 11*a* with other fingers (index finger F2, middle finger F3, ring finger F4, and little finger F5) while bringing the side portion of thumb F1 into contact with peripheral surface 32*a*.

Even in a case where hair clipper 10 (that is, an example of the cutting device) is gripped by such a method, it is possible to use hair clipper 10 (that is, an example of the cutting device) while preventing erroneous operation of dial 21.

Figure 27:
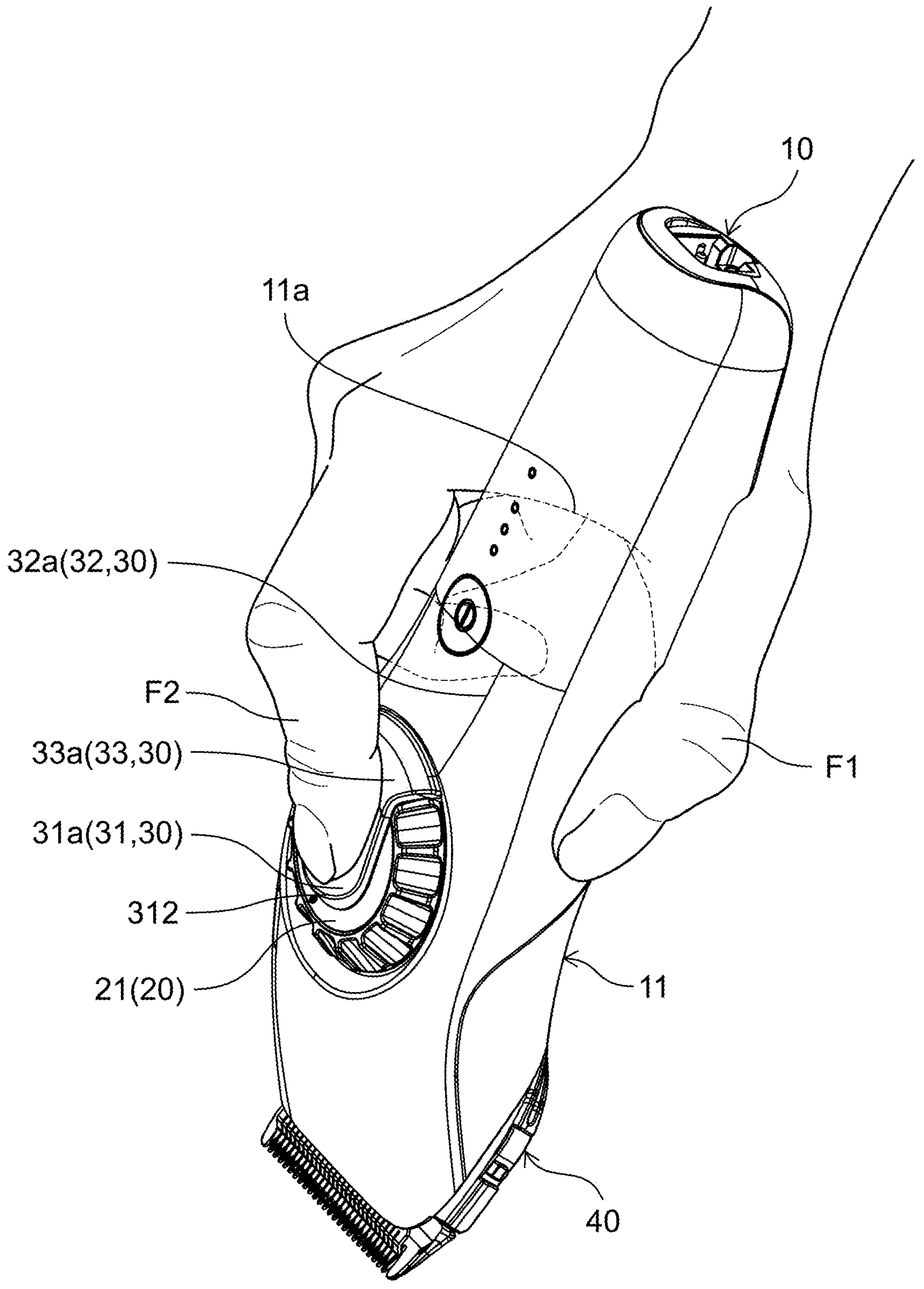
FIG. 27 is a diagram illustrating a fourth modification of the method of gripping the hair clipper according to the exemplary embodiment.

FIG. 27 is a diagram illustrating a fourth modification of the method of gripping hair clipper 10 according to the exemplary embodiment. By the method illustrated in FIG. 27, hair clipper 10 (that is, an example of the cutting device) can be gripped. FIG. 27 illustrates how to grip and hold grip 11*a* so as to pinch the grip with other fingers (thumb F1, middle finger F3, ring finger F4, and little finger F5) while holding top surface 31*a* with index finger F2.

Even in a case where hair clipper 10 (that is, an example of the cutting device) is gripped by such a method, it is possible to use hair clipper 10 (that is, an example of the cutting device) while preventing erroneous operation of dial 21.

Figure 28:
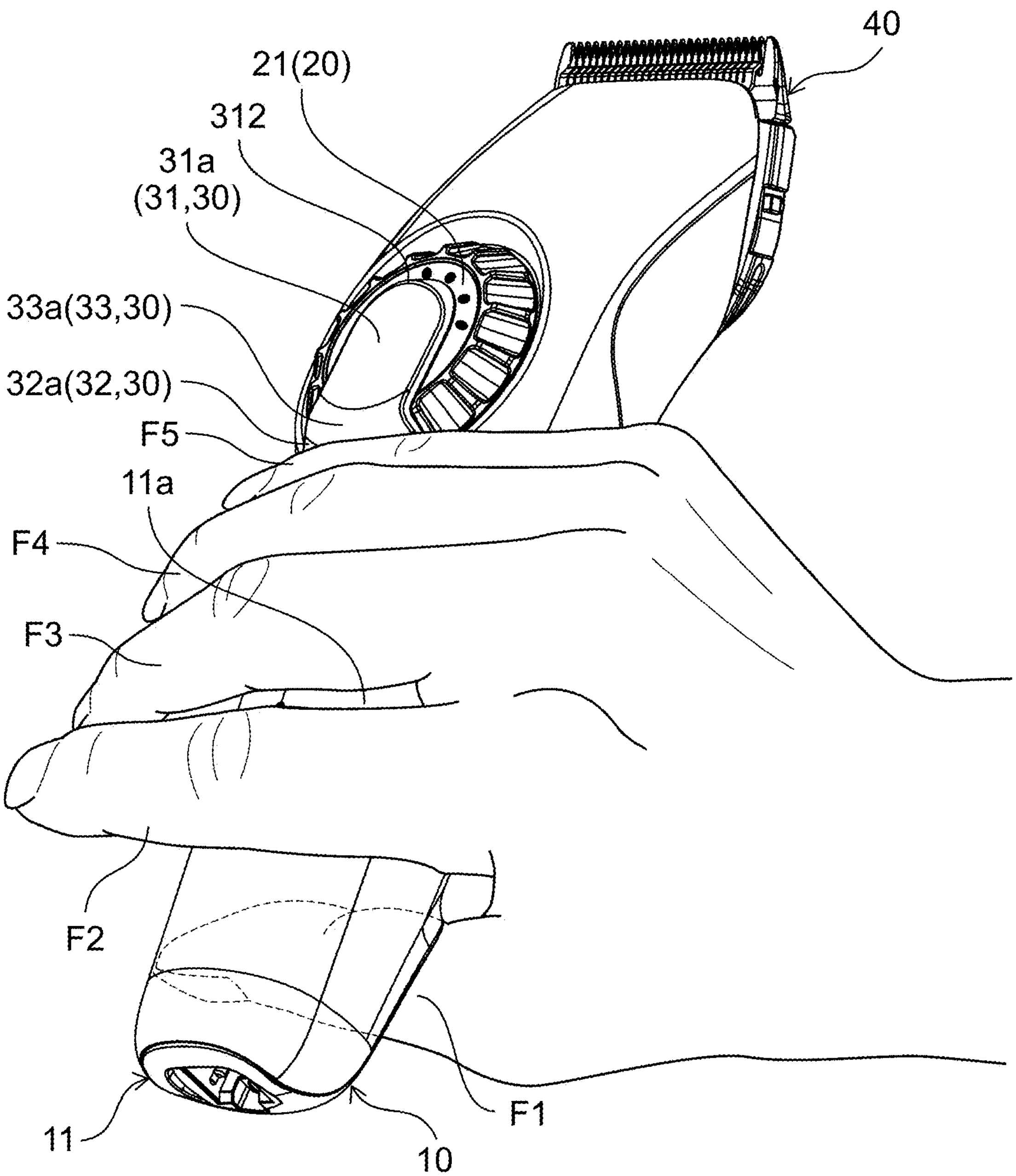
FIG. 28 is a diagram illustrating a fifth modification of the method of gripping the hair clipper according to the exemplary embodiment.

FIG. 28 is a diagram illustrating a fifth modification of the method of gripping hair clipper 10 according to the exemplary embodiment. By the method illustrated in FIG. 28, hair clipper 10 (that is, an example of the cutting device) can be gripped. FIG. 28 illustrates how to grip and hold grip 11*a* with other fingers (thumb F1, index finger F2, middle finger F3, and ring finger F4) while bringing the side portion of little finger F5 into contact with peripheral surface 32*a*.

Even in a case where hair clipper 10 (that is, an example of the cutting device) is gripped by such a method, it is possible to use hair clipper 10 (that is, an example of the cutting device) while preventing erroneous operation of dial 21.

Figure 29:
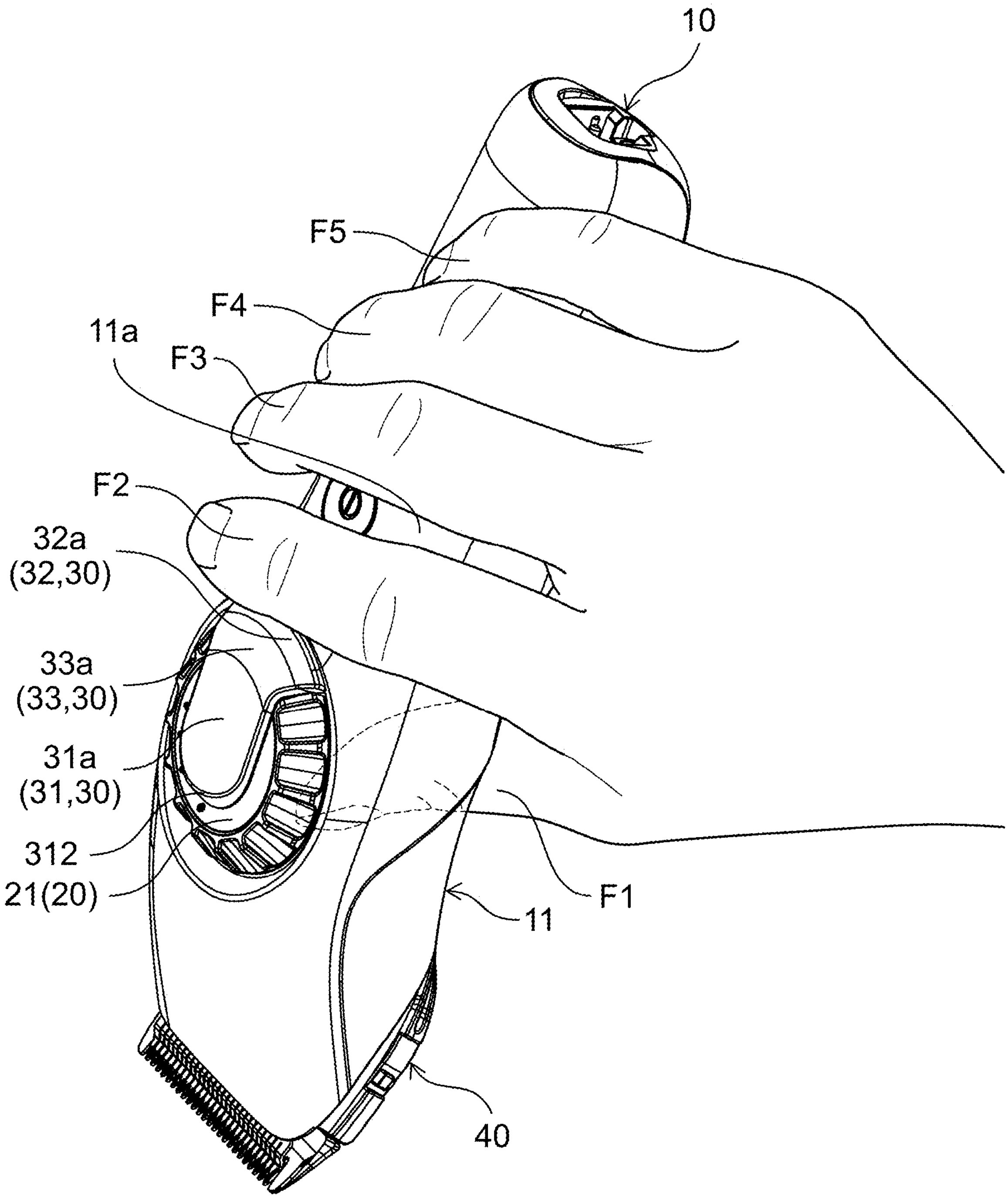
FIG. 29 is a diagram illustrating a sixth modification of the method of gripping the hair clipper according to the exemplary embodiment.

FIG. 29 is a diagram illustrating a sixth modification of the method of gripping hair clipper 10 according to the exemplary embodiment. By the method illustrated in FIG. 29, hair clipper 10 (that is, an example of the cutting device) can be gripped. FIG. 29 illustrates how to grip and hold grip 11*a* with other fingers (thumb F1, middle finger F3, ring finger F4, and little finger F5) while bringing the side portion of index finger F2 into contact with peripheral surface 32*a*.

Even in a case where hair clipper 10 (that is, an example of the cutting device) is gripped by such a method, it is possible to use hair clipper 10 (that is, an example of the cutting device) while preventing erroneous operation of dial 21.

As described above, in the present exemplary embodiment, even in a case where a method of gripping hair clipper 10 (that is, an example of the cutting device) is different, it is possible to more reliably prevent erroneous operation of dial 21 when hair clipper 10 (that is, an example of the cutting device) is used.

Furthermore, cover 30 covers the grip side of dial 21, so that the finger can be prevented from coming into contact with cover 30 when the gripping method is changed while hair clipper 10 (that is, an example of the cutting device) is being used, for example, when the gripping method is changed so that the finger is placed on cover 30 while the finger is not placed on dial 21.

Therefore, a method of gripping hair clipper 10 (that is, an example of the cutting device) can be changed while an erroneous operation of dial 21 is prevented.

As described above, hair clipper 10 (that is, an example of the cutting device) according to the present exemplary embodiment is a more user-friendly device.

Note that the way of holding hair clipper 10 (that is, an example of the cutting device) is not limited to the method illustrated in FIGS. 23 to 29, and hair clipper 10 (that is, an example of the cutting device) can be held by various methods. For example, hair clipper 10 (that is, an example of the cutting device) can be held with both hands, and even in such a holding manner, hair clipper 10 (that is, an example of the cutting device) can be used while preventing erroneous operation of dial 21.

Furthermore, in the present exemplary embodiment, an anti-slip part is formed on cover 30. Specifically, protrusion 312 is provided at a distal end of top wall 31 which faces blade part 45, and protrusion 312 has an anti-slip function.

In this way, when hair clipper 10 (that is, an example of the cutting device) are used, it is possible to more reliably prevent fingers placed on cover 30 from slipping, and it is possible to more reliably prevent an erroneous operation of dial 21 due to sliding of fingers placed on cover 30.

Note that it is also possible to provide an anti-slip function by providing an uneven shape on the surface of cover 30, and it is also possible to provide an anti-slip function by providing rubber on the surface side of cover 30. The uneven shape of the surface of cover 30 can be formed by, for example, performing emboss processing or knurling processing. Furthermore, examples of the uneven shape include a dot shape and a distal end protrusion shape (more specifically, protrusion 312 in the present exemplary embodiment).

Moreover, in the present exemplary embodiment, peripheral wall 32 is wider than top wall 31.

In this way, it is possible to more reliably prevent the finger gripping grip 11*a* or the finger placed on cover 30 from coming into contact with dial 21 while preventing the exposed area of dial 21 from being reduced as much as possible. That is, it is possible to prevent an erroneous operation of dial 21 at the time of using hair clipper 10 (that is, an example of the cutting device) while preventing operability of dial 21 from deteriorating.

In particular, in the present exemplary embodiment, the width of top wall 31 located far from grip 11*a* is narrowed. In this way, an exposed area of a portion of dial 21, which is close to grip 11*a*, can be reduced, and an exposed area of a portion of dial, which is far from grip 11*a*, can be increased. That is, the state of dial 21 is set to a state in which a portion that is relatively likely to be touched by a finger when grip 11*a* is gripped is covered with cover 30, and a portion that is relatively unlikely to be touched by a finger is exposed as much as possible. In this way, dial 21 is prevented from being erroneously operated when hair clipper 10 (that is, an example of the cutting device) is in use, while more reliably preventing operability of dial 21 from deteriorating.

Furthermore, in the present exemplary embodiment, as described above, predetermined clearance S1 is formed between the distal end of protrusion 2122 of peripheral wall 212 and surface 121*a* of dial disposition part 121. Therefore, when hair clipper 10 (that is, an example of the cutting device) are used, hair chips H (that is, an example of shavings) may enter dial 21 through clearance S1.

As described above, when hair chips H (that is, an example of the shavings) enter dial 21, there is a problem that the rotation operation of dial 21 is hindered by hair chips H (that is, an example of the shavings) or hair chips H (that is, an example of the shavings) get entangled with a spring (more specifically, push-up spring 43) that biases movable blade 46, and cutting height adjustment mechanism 20 does not function.

To solve the problem, in the present exemplary embodiment, it is possible to more reliably prevent hair chips H (that is, an example of shavings) from entering the gap formed between dial 21 and main body 11.

Figure 30:
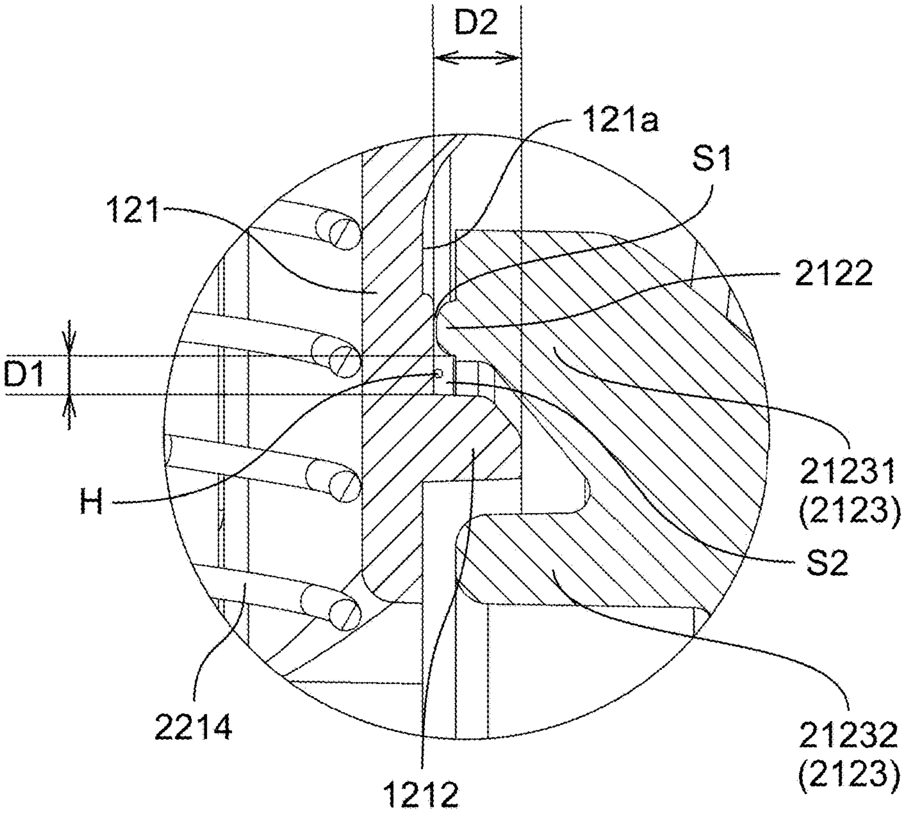
FIG. 30 is an enlarged view of part B in FIG. 4.

FIG. 30 is an enlarged view of part B in FIG. 4. Specifically, as illustrated in FIG. 30, rib 1212 is formed on main body 11 so as to face clearance S1 formed between dial 21 and main body 11 in the radial direction of dial 21.

In this way, entry of hair chips H (that is, an example of the shavings) into dial 21 through clearance S1 formed between dial 21 and main body 11 can be more reliably prevented. As described above, when entry of hair chips H (that is, an example of the shavings) into the inside of dial 21 can be prevented, inhibition of rotation of dial 21 and adjustment of a cutting height by hair chips H (that is, an example of the shavings) which have entered the inside of dial 21 can be more reliably prevented. As a result, the cutting height can be adjusted by operating dial 21 over a longer period of time, and the life of the cutting height adjustment function by operating dial 21 can be prolonged.

Note that, in the present exemplary embodiment, rib 1212 is provided on the inner peripheral side of protrusion 2122, but it is also possible to provide rib 1212 on the outer peripheral side of protrusion 2122.

Furthermore, in the present exemplary embodiment, rib 1212 has a portion overlapping with dial 21 in the radial direction of dial 21. That is, rib 1212 is formed such that at least a part (more specifically, a portion at the distal end) overlaps dial 21 (more specifically, peripheral wall 212) when viewed in the radial direction of dial 21.

In this way, a structure is obtained in which hair chips H (that is, an example of the shavings) cannot enter the inside of dial 21 only by moving in the radial direction of dial 21, and it is possible to even more reliably prevent hair chips H (that is, an example of the shavings) from entering the inside of dial 21 through clearance S1 formed between dial 21 and main body 11.

Furthermore, rib 1212 is formed in an annular shape around rotation axis C1. That is, rib 1212 is formed over the entire circumference around rotation axis C1.

In this way, even when hair chips H (that is, an example of the shavings) exists at any position around dial 21, entry of hair chips H (that is, an example of the shavings) into the inside of dial 21 is prevented by rib 1212.

Furthermore, when dial 21 is operated in a state where hair chips H (that is, an example of the shavings) exist around dial 21, hair chips H (that is, an example of the shavings) may move around dial 21 in accordance with a rotation operation of dial 21. In such a case, even if hair chips H (that is, an example of the shavings) move to any position, entry of hair chips H into the inside of dial 21 can be prevented by rib 1212. That is, when rib 1212 is formed over the entire circumference, in a case where dial 21 is rotated in a state where hair chips H (that is, an example of the shavings) exist around dial 21, entry of hair chips H (that is, an example of the shavings) into the inside of dial 21 can be prevented.

In this way, for example, even when a cutting height is changed by operating dial 21 without scraping off hair chips H (that is, an example of the shavings) adhering to the vicinity of dial 21 during use of hair clipper 10 (that is, an example of the cutting device), entry of hair chips H (that is, an example of the shavings) into the inside of dial 21 can be prevented.

As described above, in the present exemplary embodiment, since rib 1212 is formed over the entire circumference, even when the cutting height is changed at various timings, entry of hair chips H (that is, an example of the shavings) into the inside of dial 21 can be prevented, and usability of hair clipper 10 (that is, an example of the cutting device) can be further improved.

Furthermore, in the present exemplary embodiment, rib 1212 extends in the direction along rotation axis C1 of dial 21.

In this way, rib 1212 which is more difficult to get over is formed and hence, it is possible to more reliably prevent hair chips H (that is, an example of the shavings) from getting over rib 1212 and entering the inside of dial 21.

Furthermore, in the present exemplary embodiment, dial 21 includes dial-side rib 2123. In this way, a trajectory drawn by hair chips H (that is, an example of the shavings) when entering the inside of dial 21 is formed into a more complicated shape, and a structure in which hair chips H are less likely to move through entry path S2 (that is, structure in which entry of hair chips H is less likely to occur) is formed between clearance S1 and the inside of dial 21. In this case, entry of hair chips H (that is, an example of the shavings) beyond ribs 1212 into dial 21 can be more reliably prevented.

Moreover, in the present exemplary embodiment, dial-side rib 2123 includes first dial-side rib 21231 located on the outer peripheral side and second dial-side rib 21232 located on the inner peripheral side. That is, at least one of rib 1212 and dial-side rib 2123 is formed in a multiple manner in the radial direction of dial 21.

In this way, a trajectory drawn by hair chips H (that is, an example of the shavings) when entering the inside of dial 21 has a more complicated shape. Specifically, rib 1212 is formed between first dial-side rib 21231 and second dial-side rib 21232, so that bent entry path S2 is formed. In this way, entry path S2 formed between clearance S1 and the inside of dial 21 has a structure in which the hair chips H are further less likely to move through entry path S2 (that is, a structure that entry of hair chips H are further less likely to occur). Accordingly, the entry of hair chips H (that is, an example of the shavings) into the inside of dial 21 beyond rib 1212 can be even more reliably prevented.

Note that, in the present exemplary embodiment, dial 21 has multiple ribs. However, main body 11 may have multiple ribs, or dial 21 and main body 11 may have multiple ribs.

Furthermore, in the present exemplary embodiment, length D2 of rib 1212 in the direction along rotation axis C1 of dial 21 is set to be longer than length D1 of dial 21 in the radial direction from rib 1212 to dial 21.

In this way, a structure is formed in which hair chips H (that is, an example of the shavings) cannot get over rib 1212 unless hair chips H (that is, an example of the shavings) are moved at an angle of 45 degrees or more, or a plurality of hair chips H are stacked in a state where an angle of 45 degrees or more is maintained. That is, this structure makes it more difficult for hair chips H (that is, an example of the shavings) to get over ribs 1212 and enter the inside of dial 21. In this case, the entry of hair chips H (that is, an example of the shavings) beyond ribs 1212 into dial 21 can even more reliably be prevented.

Note that length D1 in the radial direction is preferably 0.3 mm or more in consideration of operability of dial 21. However, when length D1 in the radial direction increases, hair chips H (that is, an example of the shavings) easily enters the inside of dial 21. Therefore, in the present exemplary embodiment, length D1 in the radial direction is set to be 0.5 mm, which is a size capable of obtaining the effect of preventing the entry of hair chips with securing operability. As described above, in the case of hair clipper 10 for cutting hair, radial length D1 is preferably set within a range of 0.3 mm or more and 0.5 mm or less.

Furthermore, in the present exemplary embodiment, an inclined surface (more specifically, chamfering) is formed on an upper outer side of rib 1212, a height of an outer vertical surface is 0.5 mm, and a total height (that is, the height of the inner vertical surface) of rib 1212 is 1.0 mm. That is, length D2 of rib 1212 in the direction along rotation axis C1 of dial 21 is set to 1.0 mm.

As described above, in the present exemplary embodiment, length D2 of rib 1212 in the direction along rotation axis C1 of dial 21 is twice as long as radial length D1 of dial 21 from clearance S1 formed between dial 21 and main body 11 to rib 1212.

Furthermore, as illustrated in FIG. 31, in the present exemplary embodiment, opening S3*a* communicating with accommodation space S3 formed in main body 11 and capable of accommodating hair chips H (that is, an example of the shavings) is formed on the outer peripheral side of rib 1212 in main body 11. Note that, in the present exemplary embodiment, accommodation space S3 is defined by partition wall 19 disposed inside housing 12.

In this way, hair chips H (that is, an example of the shavings) adhering to the vicinity of dial 21 are actively accommodated in accommodation space S3, so that it is possible to even more reliably prevent hair chips H (that is, an example of the shavings) from entering the inside of dial 21.

Note that, in the present exemplary embodiment, as described above, hair clipper 10 (that is, an example of the cutting device) includes cover 30 that partially covers dial 21 in a state where rotation of dial 21 is permitted. Therefore, the back side of cover 30 is a portion where hair chips H (that is, an example of the shavings) are likely to accumulate, and when a large amount of hair chips H (that is, an example of the shavings) accumulate on the back side of cover 30, hair chips H (that is, an example of the shavings) existing on the back side of cover 30 are likely to entry the inside of dial 21.

To solve the problem, in the present exemplary embodiment, opening S3*a* is covered by cover 30 as viewed along rotation axis C1 of dial 21.

As described above, opening S3*a* communicating with accommodation space S3 exists on the back side of cover 30 which is a portion where hair chips H (that is, an example of the shavings) easily accumulate, whereby hair chips H (that is, an example of the shavings) accumulated in a place where it is difficult to remove hair chips can be accommodated in accommodation space S3. Note that, in the present exemplary embodiment, slit 1213 formed for attaching cover 30 to main body 11 is used as accommodation space S3.

In this way, accumulation of a large amount of hair chips H (that is, an example of the shavings) on the back side of cover 30 can be prevented, and entry of hair chips H (that is, an example of the shavings) existing on the back side of cover 30, which is a portion where hair chips H (that is, an example of the shavings) are likely to be accumulated, into the inside of dial 21 can be even more reliably prevented.

Note that cover 30 covering opening S3*a* communicating with accommodation space S3 can further improve appearance of hair clipper 10 (that is, an example of the cutting device).

ACTIONS AND EFFECTS

Hereinafter, a characteristic configuration of the cutting device described in the above exemplary embodiment and the modifications thereof and an effect obtained thereby will be described.

(Technique 1) Hair clipper 10 (that is, an example of the cutting device) described in the exemplary embodiment and the modifications of the exemplary embodiment include main body 11, fixed blade 47 fixed to main body 11, movable blade 46 capable of reciprocating in a slidably way with respect to fixed blade 47, and dial 21 rotatably attached to main body 11 and operated when a cutting height is adjusted.

Rib 1212 that faces clearance S1 formed between dial 21 and main body 11 in the radial direction of dial 21 is formed in main body 11.

As described above, hair clipper 10 (that is, an example of the cutting device) described in the exemplary embodiment and the modifications of the exemplary embodiment include dial 21 that is operated when a cutting height is adjusted. Rib 1212 that faces clearance S1 formed between dial 21 and main body 11 in the radial direction of dial 21 is formed in main body 11.

In this way, entry of hair chips H (that is, an example of the shavings) into the inside of dial 21 through clearance S1 formed between dial 21 and main body 11 can be more reliably prevented.

When the entry of hair chips H (that is, an example of the shavings) into the inside of dial 21 can be prevented, it is possible to more reliably prevent inhibition of rotation of dial 21 and adjustment of a cutting height by hair chips H (that is, an example of the shavings) that have entered the inside of dial 21. As a result, the cutting height can be adjusted by operating dial 21 over a longer period of time.

As described above, hair clipper 10 (that is, an example of the cutting device) described in the exemplary embodiment and the modifications of the exemplary embodiment can prolong the life of the function of adjusting the cutting height by operating dial 21.

(Technique 2) Furthermore, in (Technique 1) described above, rib 1212 may include a portion overlapping with dial 21 in the radial direction of dial 21.

In this way, hair chips H (that is, an example of the shavings) cannot enter the inside of dial 21 only by moving in the radial direction of dial 21. As a result, the entry of hair chips H (that is, an example of the shavings) into dial 21 through clearance S1 formed between dial 21 and main body 11 can be even more reliably prevented.

(Technique 3) Furthermore, in (Technique 1) or (Technique 2) described above, rib 1212 may be formed over an entire circumference around rotation axis C1 of dial 21.

In this way, even if hair chips H (that is, an example of the shavings) exist at any position around dial 21, entry of hair chips H (that is, an example of the shavings) into the inside of dial 21 is prevented by rib 1212 and hence, entry of hair chips H (that is, an example of the shavings) into the inside of dial 21 can be more reliably prevented.

Furthermore, when dial 21 is operated in a state where hair chips H (that is, an example of the shavings) exist around dial 21, hair chips H (that is, an example of the shavings) may move around dial 21 in accordance with a rotation operation of dial 21. In such a case, even if hair chips H (that is, an example of the shavings) move to any position, the entry of the hair chips H into the inside of dial 21 is prevented by rib 1212. That is, when rib 1212 is formed over the entire circumference, even in a case where dial 21 is rotated in a state where hair chips H (that is, an example of the shavings) exist around dial 21, the entry of hair chips H (that is, an example of the shavings) into the inside of dial 21 can be prevented.

In this way, even when, for example, during use of hair clipper 10 (that is, an example of the cutting device), a cutting height is changed by operating dial 21 without scraping off hair chips H (that is, an example of the shavings) adhering to the vicinity of dial 21, entry of hair chips H (that is, an example of the shavings) into the inside of dial 21 can be prevented. When rib 1212 is formed over the entire circumference in this manner, even in a case where the cutting height is changed at various timings, the entry of hair chips H (that is, an example of the shavings) into the inside of dial 21 can be prevented, so that the usability of hair clipper 10 (that is, an example of the cutting device) can be further improved.

(Technique 4) Furthermore, in any one of (Technique 1) to (Technique 3) described above, rib 1212 may extend in a direction along rotation axis C1 of dial 21.

Rib 1212 that is difficult to get over is formed, so that it is possible to more reliably prevent hair chips H (that is, an example of the shavings) from getting over rib 1212 and entering the inside of dial 21.

(Technique 5) In any one of (Technique 1) to (Technique 4) described above, dial 21 may include dial-side rib 2123.

In this way, a trajectory drawn by hair chips H (that is, an example of the shavings) when entering the inside of dial 21 have a more complicated shape. That is, it is possible to achieve a structure in which hair chips H are less likely to move through path S2 formed between clearance S1 and the inside of dial 21 (more specifically, a structure in which entry of hair chips H is less likely to occur). As a result, it is possible to more reliably prevent hair chips H (that is, an example of shavings) from getting over rib 1212 and entering the inside of dial 21.

(Technique 6) Furthermore, in (Technique 5) described above, at least one rib (more specifically, dial-side rib 2123) of rib 1212 and dial-side rib 2123 may be formed in a multiple manner in the radial direction of dial 21.

In this way, a trajectory drawn by hair chips H (that is, an example of the shavings) when entering the inside of dial 21 have an even more complicated shape. That is, it is possible to achieve a structure in which hair chips H are further less likely to move through entry path S2 formed between clearance S1 and the inside of dial 21 (more specifically, a structure in which entry of hair chips H is further less likely to occur). As a result, it is possible to even more reliably prevent hair chips H (that is, an example of the shavings) from getting over rib 1212 and entering the inside of dial 21.

(Technique 7) Furthermore, in any one of (Technique 1) to (Technique 6) described above, length D2 of rib 1212 in a direction along rotation axis C1 of dial 21 may be longer than length D1 of dial 21 in the radial direction from rib 1212 to dial 21.

In this way, a structure in which hair chips H (that is, an example of shavings) cannot get over rib 1212 unless hair chips H (that is, an example of shavings) are moved at an angle of 45 degrees or more or a plurality of hair chips H are stacked in a state where an angle of 45 degrees or more is maintained can be obtained. That is, it is possible to achieve a structure in which it is more difficult for hair chips H (that is, an example of the shavings) to get over rib 1212 and enter the inside of dial 21. As a result, it is possible to even more reliably prevent hair chips H (that is, an example of the shavings) from getting over rib 1212 and entering the inside of dial 21.

(Technique 8) Furthermore, in any one of (Technique 1) to (Technique 7) described above, opening S3*a* communicating with accommodation space S3 formed in main body 11 and capable of accommodating hair chips H (that is, an example of the shavings) may be formed on an outer peripheral side of rib 1212 in main body 11.

In this way, hair chips H (that is, an example of the shavings) adhering to the vicinity of dial 21 can be actively accommodated in accommodation space S3. As a result, the entry of hair chips H (that is, an example of the shavings) into the inside of dial 21 can be even more reliably prevented.

(Technique 9) Furthermore, in (Technique 8) described above, hair clipper 10 (that is, an example of the cutting device) may further include cover 30 that covers a part of dial 21 in a state where rotation of dial 21 is permitted. Opening S3*a* may be covered with cover 30 as viewed along rotation axis C1 of dial 21.

As described above, when cover 30 that covers a part of dial 21 is provided in a state where rotation of dial 21 is permitted, the back side of cover 30 becomes a portion where hair chips H (that is, an example of the shavings) are likely to be accumulated. When a large amount of hair chips H (that is, an example of the shavings) accumulates on the back side of cover 30, hair chips H (that is, an example of the shavings) existing on the back side of cover 30 easily enters the inside of dial 21.

However, when opening S3*a* communicating with accommodation space S3 exists on the back side of cover 30, which is a portion where hair chips H (that is, an example of the shavings) are likely to be accumulated, hair chips H (that is, an example of the shavings) accumulated in a place where it is difficult to remove the hair chips can be accommodated in accommodation space S3. By accommodating hair chips H (that is, an example of the shavings) accumulated on the back side of cover 30, which are difficult to remove, in accommodation space S3, it is possible to prevent a large amount of hair chips H (that is, an example of the shavings) from being accumulated on the back side of cover 30. In this way, the entry of hair chips H (that is, an example of the shavings) existing on the back side of cover 30, which is a portion where hair chips H (that is, an example of the shavings) are likely to be accumulated, into the inside of dial 21 can be even more reliably prevented.

Furthermore, covering opening S3*a* communicating with accommodation space S3 with cover 30 is advantageous in that the appearance of hair clipper 10 (that is, an example of the cutting device) can be further improved.

[Others]

Although the contents of the cutting device according to the present disclosure have been described above, the present disclosure is not limited to these descriptions, and it is obvious to those skilled in the art that various modifications and improvements can be made.

For example, the present disclosure can be applied to exemplary embodiments in which changes, replacements, additions, omissions, and the like of the configurations described in the above exemplary embodiment and the modifications thereof are made. Furthermore, it is also possible to make a new exemplary embodiment by combining the constituent elements described in the above exemplary embodiment and the modifications thereof.

Furthermore, specifications (shape, size, layout, and the like) of the main body, the blade part, and other details can be changed as appropriate.

As described above, the cutting device according to the present disclosure can more reliably prevent shavings from entering the gap formed between the dial and the main body. Therefore, the cutting device according to the present disclosure can be applied not only to hair but also to uses such as treatment of various body hairs such as humans and animals, and cutting of branches of grass and trees.

What is claimed is:

1. A cutting device comprising:
- a main body;
- a fixed blade fixed to the main body;
- a movable blade configured to reciprocate in a slidable way with respect to the fixed blade; and
- a dial which is rotatably attached to the main body and is configured to be operated when a cutting height is adjusted, the dial being rotatable along a rotational axis, wherein:
- the dial is disposed on a dial disposition part of the main body,
- the dial comprises a first dial-side rib located on an outer peripheral side of the dial and a second dial-side rib located on an inner peripheral side of the dial,
- a bottom of the first dial-side rib includes a bottom surface and a protrusion protruding from the bottom surface to the dial disposition part, and
- the dial disposition part comprises a rib protruding into a space formed between the first dial-side rib and the second dial-side rib, and faces a clearance formed between the protrusion and the dial disposition part.

2. The cutting device according to claim 1, wherein
- the rib extends in a direction parallel to the rotation axis of the dial.

3. The cutting device according to claim 1, wherein
- the rib has a protruding length in a direction parallel to the rotation axis of the dial longer than a length from the rib to a part of the protrusion closest to the rib.

4. The cutting device according to claim 1, wherein
- the main body comprises an opening formed on an outer peripheral side of the main body with respect to the rib, and
- the opening communicates with an accommodation space which is formed in the main body and is configured to accommodate shaved hair.

5. The cutting device according to claim 4, further comprising:
- a cover that covers a part of the dial in a state where rotation of the dial is permitted,
- wherein
- the opening is covered with the cover as viewed along a rotation axis of the dial.

* * * * *